US010935861B1

(12) United States Patent
Rhodes et al.

(10) Patent No.: US 10,935,861 B1
(45) Date of Patent: Mar. 2, 2021

(54) MODULAR REFLECTIVE LIGHT-DIFFUSER DEVICES

(71) Applicant: Adobe Inc., San Jose, CA (US)

(72) Inventors: Tenell Rhodes, Campbell, CA (US); Gavin S. P. Miller, Los Altos, CA (US); Christine Dierk, Berkeley, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/741,502

(22) Filed: Jan. 13, 2020

(51) Int. Cl.
| | |
|---|---|
| *G02F 1/137* | (2006.01) |
| *G02F 1/1334* | (2006.01) |
| *G02F 1/133* | (2006.01) |
| *G02F 1/1335* | (2006.01) |
| *G02F 1/1333* | (2006.01) |
| *A41D 1/00* | (2018.01) |

(52) U.S. Cl.
CPC ............ *G02F 1/137* (2013.01); *G02F 1/1334* (2013.01); *G02F 1/13306* (2013.01); *G02F 1/13338* (2013.01); *G02F 1/133305* (2013.01); *G02F 1/133553* (2013.01); *A41D 1/002* (2013.01); *G02F 2201/16* (2013.01)

(58) Field of Classification Search
CPC ....................................................... G02F 1/137
See application file for complete search history.

(56) References Cited

U.S. PATENT DOCUMENTS

| 10,181,299 B1* | 1/2019 | Miller ..................... G02F 1/137 |
| 2012/0007898 A1* | 1/2012 | Pavicic ..................... G09G 3/32 |
| | | 345/690 |
| 2012/0162268 A1* | 6/2012 | Fleck ..................... G02F 1/1336 |
| | | 345/690 |
| 2017/0041598 A1* | 2/2017 | Smithwick ............. H04N 13/30 |

OTHER PUBLICATIONS

Berkeley School of Information—Color-Changing "Smart Thread" Turns Fabric into a Computerized Display; dated Jun. 6, 2016; https://www.ischool.berkeley.edu/news/2016/color-changing-smart-thread-turns-fabric-computerized-display.
"Digital Pixel Aurora LED dress with wireless control"; dated Jan. 14, 2016; http://led-clothing.com/digital-pixel-aurora-katy-perry-led-dress.html.

\* cited by examiner

*Primary Examiner* — Sang V Nguyen
(74) *Attorney, Agent, or Firm* — Keller Jolley Preece

(57) ABSTRACT

The present disclosure relates to non-emissive modular light-diffuser devices that selectively revealing reflective material and that can be utilized in applications ranging from wearable electronics to large format displays. For example, by applying power, the modular light-diffuser devices can switch from a light-scattering state and a non-light-scattering state to reveal reflective material beneath. In particular, a modular light-diffuser device can utilize dual inputs to provide an alternating low-voltage current to a PDLC film layer (e.g., by rotating the direction of electrical polarity), thus, significantly extending the life of the modular light-diffuser device. In addition, multiple modular light-diffuser (Continued)

devices can be grouped and added to objects (e.g., clothing, fashion accessories, or large format displays) to form patterns, designs, and animations based on the modular light-diffuser devices changing states.

20 Claims, 19 Drawing Sheets

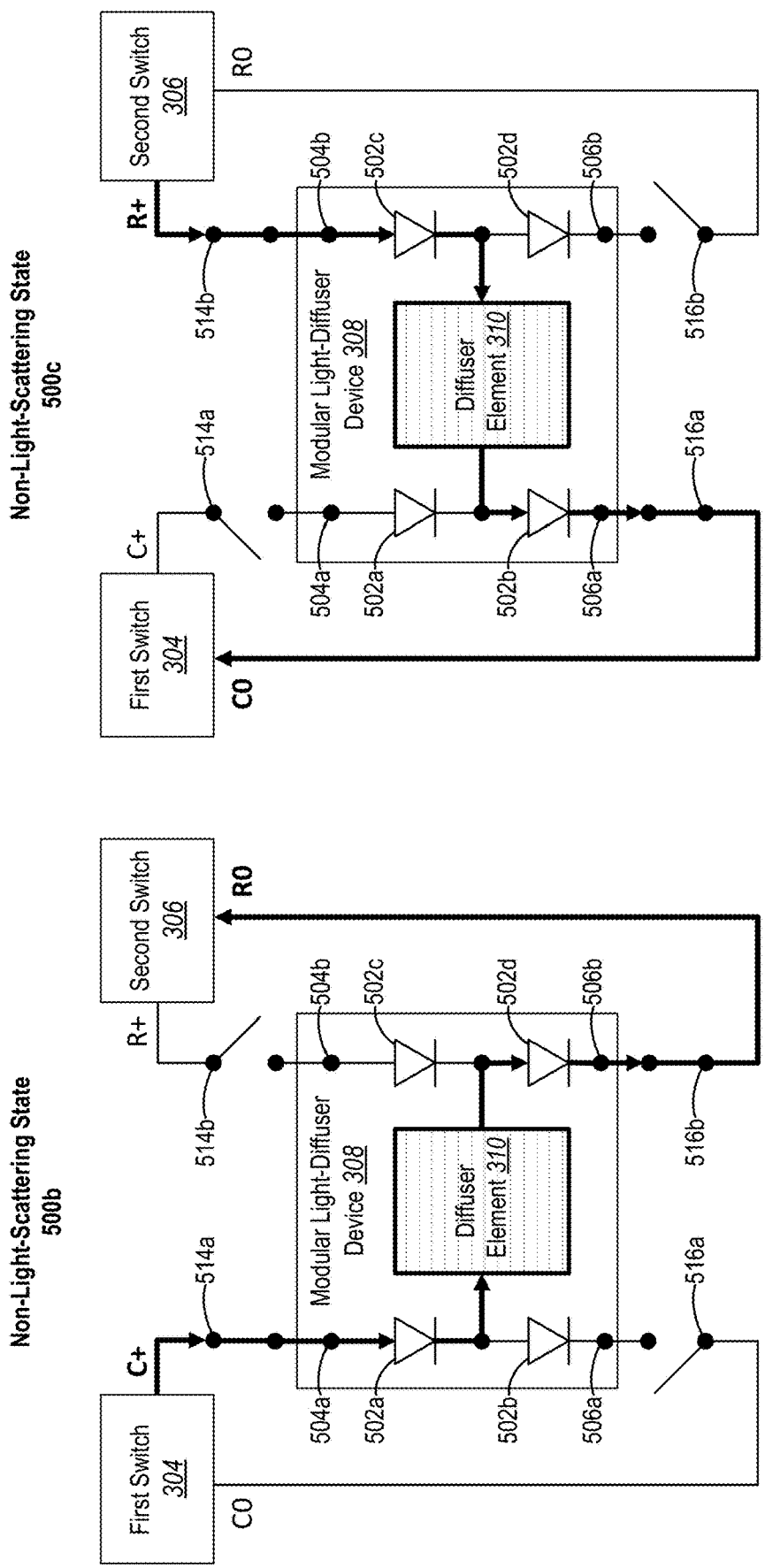

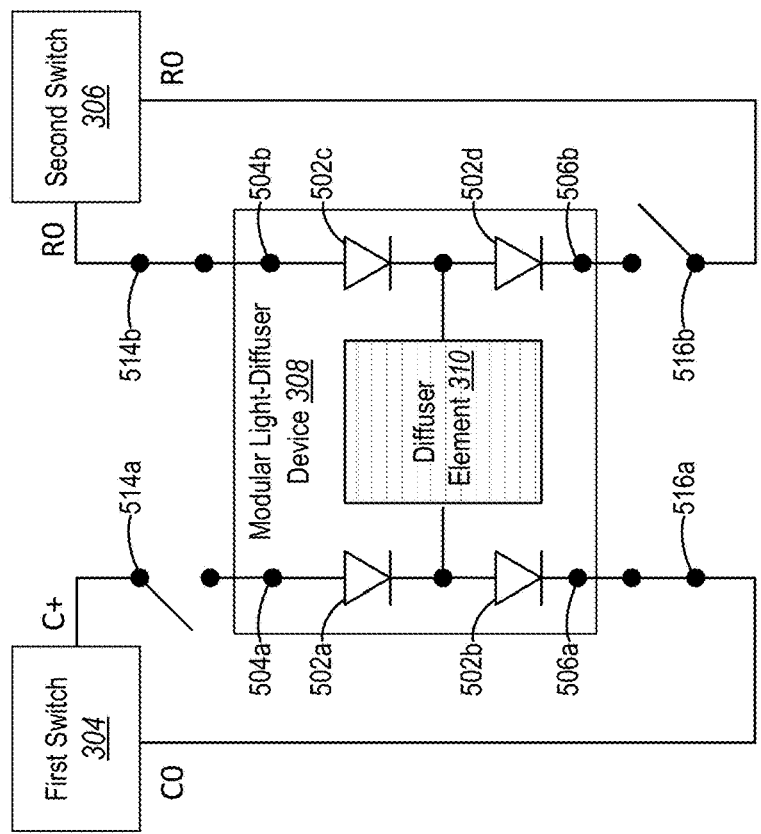
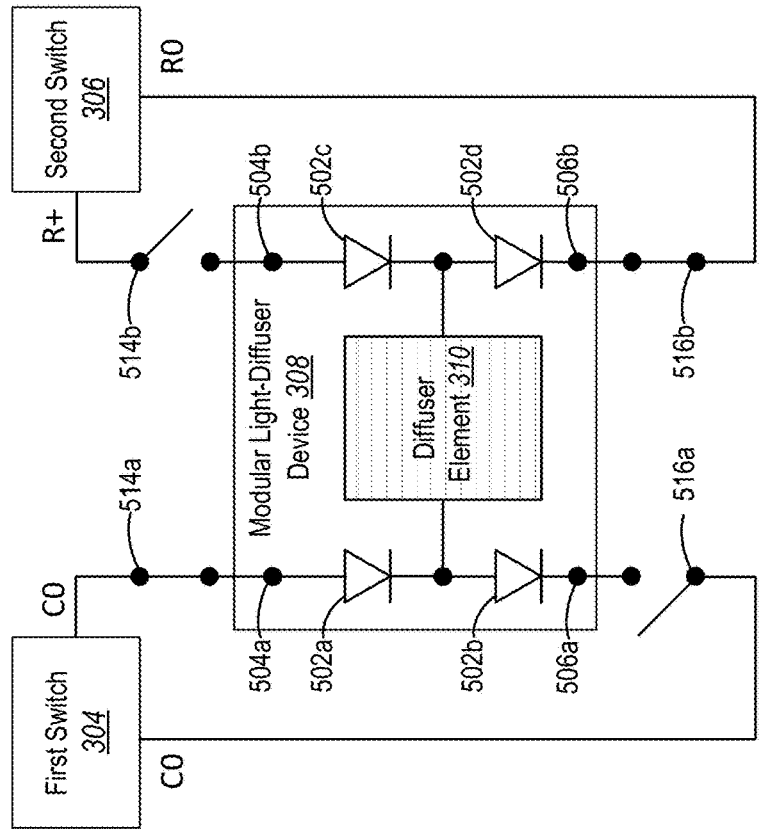

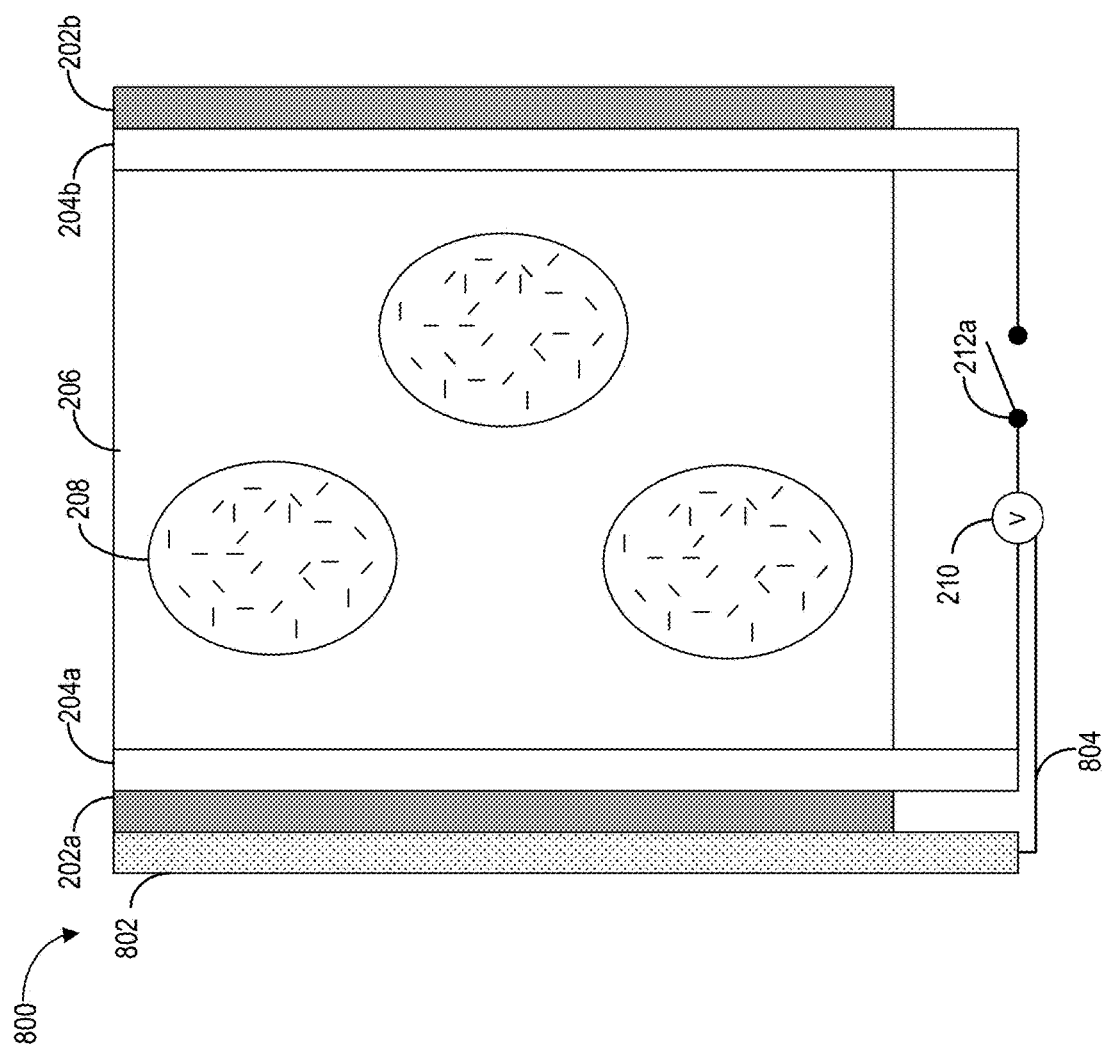

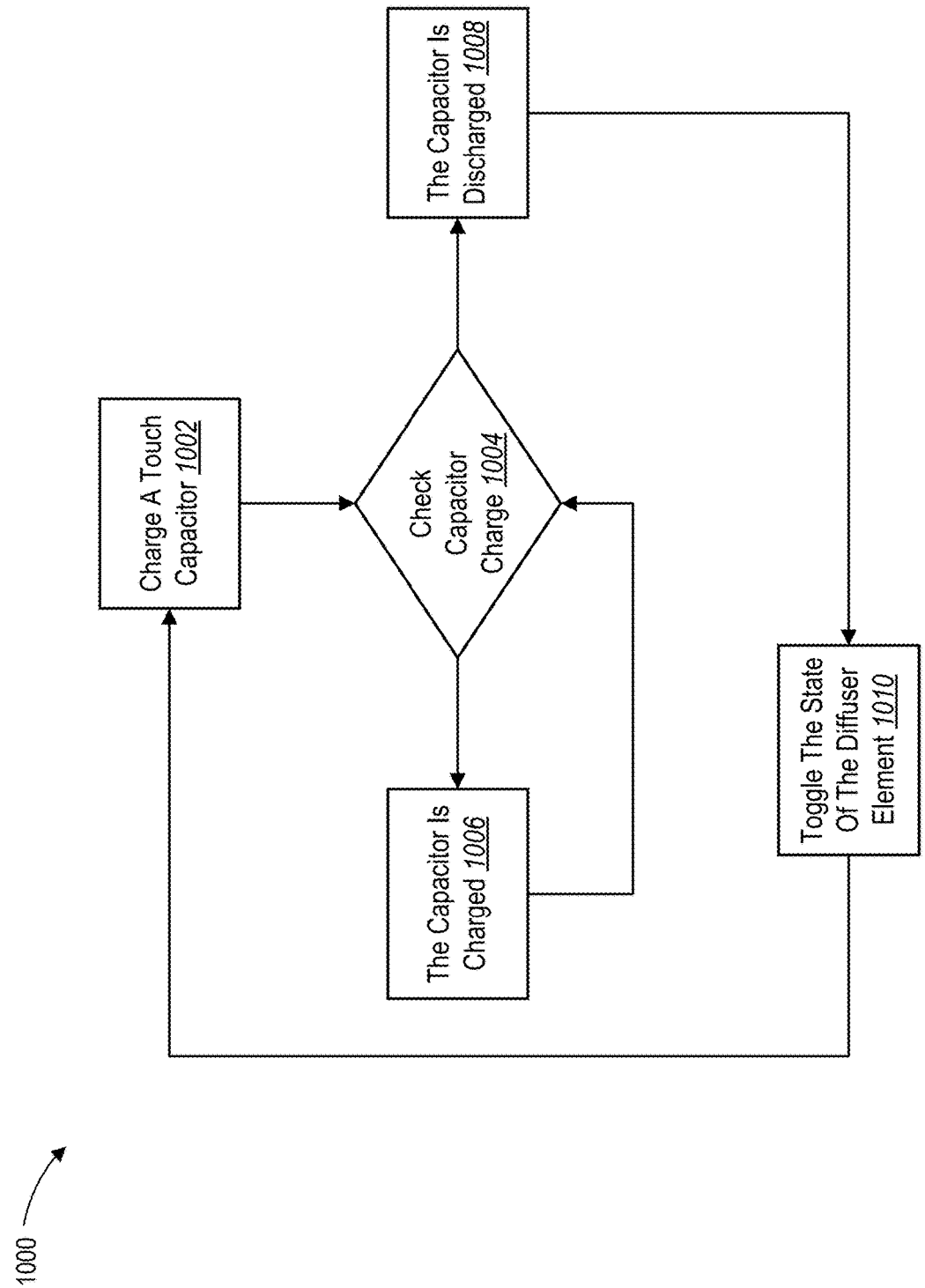

MODULAR REFLECTIVE LIGHT-DIFFUSER DEVICES

BACKGROUND

Recent years have seen increased development in the area of wearable electronics. For instance, incorporating light emitting diodes (LEDs) into fashion (e.g., clothing, garments, and fashion accessories) to show patterns, designs, and displays are increasing in use and popularity. Other examples of incorporating wearable electronics into fashion include electronic-ink and electronic paper devices.

Although development in the area of wearable electronics is increasing, a number of shortcomings remain. For instance, some conventional wearable electronics, such as wearable LEDs, can require relatively large power sources when considered for use as part of an article of clothing or fashion accessory. For example, these relatively large power sources can be bulky and impractical to wear or carry around. Further, these relatively large power sources can be difficult to conceal within a garment or fashion accessory.

In addition to being cumbersome, some conventional wearable electronics can require relatively high voltages when considered for use as part of an article of clothing or fashion accessory, especially when a large number of wearable electronics are utilized to create a noticeable effect. These relatively high voltages can be unsafe and potentially dangerous to users if they are to come in contact with them, which is problematic for wearable electronics. Moreover, to sustain the relatively high voltages and currents needed for such conventional wearable electronics, relatively thick wires are often needed, which can become hot due or otherwise uncomfortable for an individual.

Additionally, many conventional wearable electronics are rigid and do not fit the contours of an individual's body shape well. In particular, many conventional wearable electronics are fixed to garments in a manner that restricts free-flowing movement of the garment. For example, many conventional wearable electronics are often made of rigid material and securely fastened to garments, which prevents the garments from moving freely. In addition, many conventional wearable electronics can include thick wires that themselves can be relatively restrictive.

While some conventional wearable electronics can operate at lower voltages, such as wearable electronic ink materials, these wearable electronics are typically limited in their operation. For example, such conventional wearable electronics typically suffer from issues of rigidity and inflexibility, as described above. Additionally, such conventional wearable electronics are typically low resolution and limited in their fashion and design capabilities.

Additionally, because of the above and other shortcomings of conventional wearable electronics, some users are turning to alternative methods and devices, such as trying to incorporate color-changing thread into clothing. However, these alternatives also suffer from numerous problems, such as low and grainy resolutions, slow refresh rates, and expensive manufacturing costs.

Thus, there are several disadvantages with regard to conventional wearable electronics.

SUMMARY

One or more embodiments of the present disclosure provide benefits and/or solve one or more of the foregoing or other problems in the art with modular reflective light-diffuser devices that are flexible and provide the ability to be incorporated into a wide range of designs due to their modularity. For example, the modular reflective light-diffuser devices disclosed herein flexibly attach to garments and operate at relatively low voltages. In addition, when powered, these modular reflective light-diffuser devices can switch between a light-scattering state and a non-light-scattering state to reveal a reflective or other decorative material beneath. Indeed, the disclosed modular reflective light-diffuser devices can provide a flexible, safe, durable, portable, inexpensive, and visually rich solution to problems facing conventional wearable electronics.

As disclosed herein, modular reflective light-diffuser devices can include polymer dispersed liquid crystal (PDLC) devices. To illustrate, in various embodiments, the systems and methods described herein can provide generated alternating current to a PDLC film layer of a modular reflective light-diffuser device (e.g., by reversing the direction of electrical polarity) to significantly extend the life of the PDLC film layer while also utilizing low voltages to power the modular reflective light-diffuser device. Additionally, multiple modular light-diffuser devices can be grouped together and flexibly added to clothing or fabrics to form patterns, designs, and animations based on the modular reflective light-diffuser devices changing states. Further, modular reflective light-diffuser devices can be assembled and shown on large format displays (i.e., a wall, billboard, sign). In some embodiments, the modular reflective light-diffuser devices can include touch elements to facilitate state changes based on touch input (e.g., change between the light-scattering state and the non-light-scattering state).

While this summary refers to the disclosed devices for simplicity, the summary also applies to disclosed systems and methods that utilize the disclosed devices. The following description sets forth additional features and advantages of one or more embodiments of the disclosed devices, systems, and methods.

BRIEF DESCRIPTION OF THE DRAWINGS

The detailed description provides one or more embodiments with additional specificity and detail through the use of the accompanying drawings, as briefly described below.

FIGS. 5A-5H illustrate examples of the modular light-diffuser device in different states in accordance with one or more embodiments.

FIG. 8 illustrates example layers of a PDLC component with a touch-conductive layer within a modular light-diffuser device in accordance with one or more embodiments.

FIG. 10 illustrates a state diagram of changing the state of a modular light-diffuser device based on touch input in accordance with one or more embodiments.

DETAILED DESCRIPTION

Figure 1A:
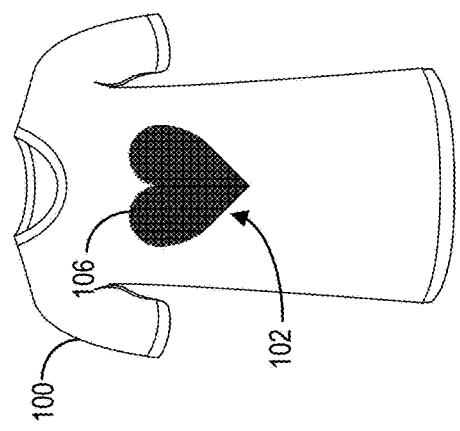
FIGS. 1A-1D illustrate an example shirt that include multiple modular light-diffuser devices operating in various states in accordance with one or more embodiments.

This disclosure describes one or more embodiments of modular light-diffuser devices that can be affixed to objects including portable objects such as clothing and textiles as well as arranged into less portable objects such as large format displays. In various embodiments, the modular light-diffuser devices can utilize a low-voltage generated alternating current that rotates the direction of electrical polarity to power a polymer dispersed liquid crystal (PDLC) diffuser component and enable the PDLC diffuser component to change from diffuse to transparent. Additionally, multiple modular light-diffuser devices can be grouped together and flexibly added (e.g., like sequins) to clothing or fabrics to form patterns, designs, and animations based on the modular light-diffuser devices changing states. Similarly, the modular light-diffuser devices can be joined to form large format displays, where each modular light-diffuser device functions as a pixel. Further, the modular light-diffuser devices can include touch elements to facilitate individual or group state changes (e.g., between the light-scattering state and the non-light-scattering state) based on touch input.

As mentioned above, the modular light-diffuser device can utilize a diffuser component. In one or more embodiments, the diffuser component includes a combination of layers made of different materials. For example, the diffuser component can include polyethylene terephthalate (PET) layers, conductive coating layers, and a polymer layer that includes liquid crystal molecules (e.g., a PDLC film layer). In some embodiments, the diffuser component can also include a touch-conductive layer, as further described below.

As also mentioned above, the diffuser component can change states from the light-scattering state (e.g., diffuse or at least partially obscured) to the non-light-scattering state (e.g., transparent) when electrical current is applied. Notably, the configuration of the modular light-diffuser device enables a low-voltage direct current (DC) power source to provide generated alternating current (AC) through the diffuser component (e.g., the PDLC film layer). In this manner, the diffuser component can operate safely and without rapidly deteriorating.

To generate alternating current to flow through the diffuser component, the modular light-diffuser device receives the low-voltage power (e.g., from a direct current power source) via multiple switches (e.g., analog or logic). For example, a first switch can provide power to the modular light-diffuser device via a first circuit path having a first electrical polarity direction and a second switch can provide power to the modular light-diffuser device via a second circuit path having a second or reverse electrical polarity direction. In one or more embodiments, power provided to via the first circuit path passes through a first diode, through the diffuser component, and through a fourth diode. Similarly, power provided to the second circuit path passes through a third diode, the diffuser component, and a second diode. A first side of the diffuser component can be connected between the first diode and the second diode. A second side of the diffuser component can be connected between the third diode and the fourth diode. In this manner, the modular light-diffuser device can receive power in a first direction (e.g., the first polarity) through the diffuser component via the first circuit path. Similarly, the modular light-diffuser device can receive power in a second direction (e.g., the second polarity) through the diffuser component via the second circuit path. By alternating the first and second switch at a frequency (e.g., 50 Hertz), the modular light-diffuser device can receive generated alternating current.

In additional embodiments, the switches can create closed and open circuit paths to control the flow of current through the modular light-diffuser device, as described above. By coordinating which circuit paths from the switches to the modular light-diffuser device are open or closed at different periods of time across the switches (e.g., by a modular light-diffuser system), the switches can enable generated alternating current to flow through the diffuser component (e.g., the same current and voltage differential with alternating polarity).

In one or more embodiments, the modular light diffuser devices are secured over a reflective material, and are thus, modular reflective light diffuser devices. The reflective material can help provide a decorative and noticeable effect when a modular reflective light-diffuser device is in the non-light diffusing state. Indeed, the use of the reflective material can provide a visually pleasing and noticeable effect without the use of an emissive light source, such as LEDs.

As mentioned above, in one or more embodiments, multiple modular light-diffuser devices can be grouped together. In these embodiments, the modular light-diffuser devices can be utilized in connection with a modular light-diffuser system to reduce the number of electrical connections (e.g., wires, copper tape, traces, conductive threads, or other conductive material) and switches needed to control the group of modular light-diffuser devices. For instance, when the modular light-diffuser devices are organized into a grid of rows and columns, a modular light-diffuser system can selectively operate the modular light-diffuser devices utilizing one switch per row and one switch per column as well as connect multiple modular light-diffuser devices with fewer electrical connections. For example, the modular light-diffuser system can control a 10×10 grid of modular light-diffuser devices (e.g., 100 devices) using 20 switches (e.g., 10 row switches and 10 column switches).

In various embodiments, the modular light-diffuser device is included on a regular or flexible printed circuit board (PCB). For example, a circuit board can include the circuitry components of the modular light-diffuser device (e.g., traces, conductive elements, diodes) connected to the diffuser component, which is located separately from the circuit board. In some embodiments, the switches and/or other components are integrated into one or more circuit boards, as described below.

In some embodiments, the modular light-diffuser device includes touch capabilities, as mentioned above. For instance, the modular light-diffuser device includes a touch element in connection with the diffuser component that detects when user touch input has been received. For example, the touch element can include a touch layer, seam, edge, mesh, conductive elements (e.g., copper tape), impact detector, and/or vibration switch. When touch input is detected, a modular light-diffuser device can toggle states between light-scattering and non-light-scattering. In one or more embodiments, the modular light-diffuser system can toggle the state of multiple modular light-diffuser devices and/or trigger an animation across one or more modular light-diffuser devices in response to touch input.

As mentioned above, modular light-diffuser devices can be attached to clothing or textiles, and in particular, on top of reflective material. For example, each diffuser component can be attached to clothing (e.g., sewn, crimped, screwed, glued, taped), similar to attached sequins. Indeed, the diffuser component (e.g., the PDLC film) of the modular light-diffuser device can range in size in shape and placed in numerous arrangements. Further, multiple diffuser components can be stacked together to create different transparency effects (e.g., multiple granularities of transparency from clear to diffuse) that cause material beneath the diffuser components to appear change from more visible to less visible, and in some cases opaque.

As previously mentioned, the modular light-diffuser device can provide numerous advantages, benefits, and practical applications over conventional wearable electronics. For example, the modular light-diffuser devices are small and portable. As mentioned above, the diffuser component of the modular light-diffuser device can vary in shape and size. For example, each of the modular light-diffuser devices can be as small as a quarter-inch square. Other parts needed to operate the modular light-diffuser devices, such as PCBs, can also be small in size, so as to be inconspicuously hidden when attached to clothing. Indeed, the small size of the modular light-diffuser devices enables multiple modular light-diffuser devices to be added to clothing or other portable objects. Alternatively, multiple modular light-diffuser devices can be joined to create large format displays (e.g., a wall display).

As another benefit, modular light-diffuser devices utilize low-voltage power. For example, a modular light-diffuser device can operate with 5, 7, or 15 volts or optionally more than 15 volts (e.g., up to 30 volts). In some embodiments, the modular light-diffuser device can operate at logic signal voltage levels (e.g., 5 volts), depending on the characteristics of the PDLC component. By operating at a low voltage, the modular light-diffuser device is safer for users to wear on clothing or on another object with which a user may come into contact. In addition, utilizing low-voltage power enables the modular light-diffuser devices to operate with smaller electrical connections (e.g., copper tape, traces, or wires) and at lower currents, which is safer for users. Further, utilizing low-voltage power can result in smaller chips and less material to be embedded on a user's clothing.

In addition, the modular light-diffuser devices are flexible. For example, just as sequins can move with fabric that stretches, bends, or folds, modular light-diffuser devices can similarly move and flow. Further, due to the small size and low voltage, modular light-diffuser devices can use small electrical connections (i.e., conductive material) to flexibly connect to supporting circuitry and a power source, which enables the modular light-diffuser devices to be nonrestrictive. Indeed, the small size and flexible material of the diffuser component make modular light-diffuser devices ideal for application on clothing and other portable objects.

As another advantage, systems including the modular light-diffuser devices can generate (e.g., produce or create) alternating current (e.g., a square wave) signal across the diffuser component based on a direct current power source. Indeed, systems including modular light-diffuser devices can utilize direct current power from one or more batteries or other power sources to supply current in opposing directions (e.g., opposite polarities) across the diffuser component (e.g., PDLC film). In contrast, applying direct current to the diffuser component for a sustained period of time can result in rapid deterioration of the PDLC film (e.g., the film typically fails within days). Accordingly, by applying generated alternating current across the diffuser component, the lifespan and longevity of the diffuser component significantly increases.

Moreover, the modular light-diffuser devices can provide a pixilated display that has a higher resolution than many conventional wearable electronics. Further, the modular light-diffuser devices can utilize at least video refresh rates (e.g., over 24 HZ) to transition modular light-diffuser devices between the light-scattering state and the non-light-scattering state. Indeed, multiple modular light-diffuser devices can toggle between states in a synchronized manner to create rich animations.

Additional advantages and benefits of the modular light-diffuser device and corresponding modular light-diffuser system will become apparent in view of the following description. Further, as illustrated by the foregoing discussion, the present disclosure utilizes a variety of terms to describe features and advantages of the feature contribution system. For example, as used herein, the terms "PDLC diffuser component," "diffuser component," or "diffuser element" refer to a portion of a modular light-diffuser device that selectively scatters or allow passage of light. In particular, a diffuser element can include a sheet, screen, film, or layer of material that can alternate between a non-light-scattering state that allows light to pass therethrough and a light-scattering state that scatters light thereby preventing at least some light from passing therethrough. Indeed, the diffuser component can be composed of a material that, in response to electrical stimulation, transitions from a diffused appearance (i.e., in the light scattering state) to a transparent appearance (i.e., in the non-light-scattering state) or vice-versa. For example, the diffuser element includes a PDLC film that can alternate between a non-light-scattering state and a light-scattering state.

In addition, as used herein, the terms "light-scattering state," "scattering state," or "scattered state" refer to a state of an object that scatters light. When an object scatters light, the light directed at the object is deflected at various of angles (i.e., making the object appear diffuse or at least partially opaque). When a modular light-diffuser device is in a light-scattering state, the modular light-diffuser device can become diffuse and can block or otherwise obscure (at least partially) the view of objects or material behind the modular light-diffuser device.

As used herein, a "non-light-scattering state" refers to a state of an object that allows all (or nearly all) light directed at the object to pass through the object without blur or attenuation. When a modular light-diffuser device is in a non-light-scattering state, the modular light-diffuser device can become transparent and can allow the view of objects or material behind the modular light-diffuser device.

The term "low-voltage power source," as used herein, refers to a power source that is 30 volts or less (i.e., the industry's danger voltage threshold for human contact). For example, 15 volts is a low-voltage power source. In some embodiments, a low-voltage power source includes negative voltage (e.g., −15 volts). In various embodiments, a low-voltage power source includes one or more batteries that provide power to one or more modular light-diffuser devices. In addition, a low-voltage power source is safer for users to wear in clothing articles. In one or more embodiments, a low-voltage power source is a direct current ("DC") power source.

Referring now to the figures, FIGS. 1A-1D illustrate a clothing article that includes multiple modular reflective light-diffuser devices operating in various states in accordance with one or more embodiments. As illustrated, FIGS. 1A-1D shows a clothing article 100 (e.g., a shirt) that includes a pattern 102 of PDLC diffuser components 104. As shown, the pattern 102 forms a heart shape design made up of the PDLC diffuser components 104 arranged into a grid of rows and columns to create a dense dot matrix of pixels (e.g., texture pixels or "texels").

In various embodiments, the PDLC diffuser components 104 are attached to the clothing article 100 by sewing or otherwise fastening them (e.g., crimping, screwing, gluing, taping) to the clothing article 100. For instance, the PDLC diffuser components 104 can include one or more small holes that allow them to be fastened on like sequins. Indeed, because PDLC diffuser components 104 are connected via a flexible conductor and the PDLC diffuser components 104 are not rigidly connected to each other, the PDLC diffuser components 104 can be attached in a manner that does not meaningfully impede movement or use of the clothing article 100 by a user.

As mentioned above, each of the PDLC diffuser components 104 can change from a light-scattering state to a transparent state when power is applied. For example, when PDLC diffuser components 104 are not powered, they can appear white, cloudy, diffuse, and at least partially opaque. If the clothing article 100 is similar in color and material, the PDLC diffuser components 104 can appear hidden when in the light-scattering state. When power is applied, the PDLC diffuser components 104 can become transparent, revealing the fabric or material located beneath them. For instance, when the PDLC diffuser components 104 are placed above a reflective, mirror-like material, the mirror will be visible when the PDLC diffuser components 104 are in the transparent state.

Figure 1B:
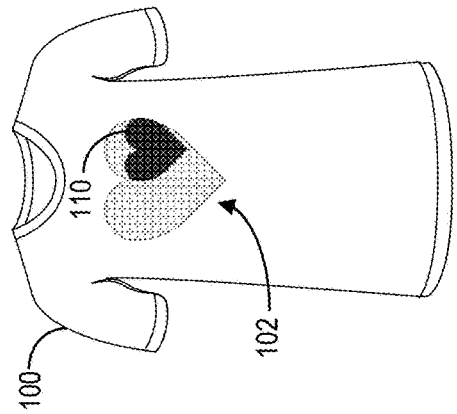

To illustrate, FIG. 1A shows all of the PDLC diffuser components 104 in a non-powered, light-scattering state. Here, the PDLC diffuser components 104 can appear to blend into the shirt itself. Alternatively, the PDLC diffuser components 104 can appear as a decorative material attached to the shirt (e.g., sequins). When power is driven to each of the PDLC diffuser components 104, they become transparent. For example, FIG. 1B shows a large heart design 106 where all of the PDLC diffuser components 104 are in a powered, transparent state. As shown in FIG. 1B, driving power to each of the PDLC diffuser components 104 causes them to reveal the reflective fabric behind the PDLC diffuser components 104.

Figure 1C:
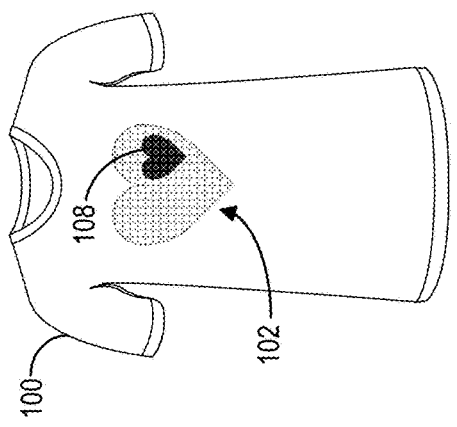
Figure 1D:
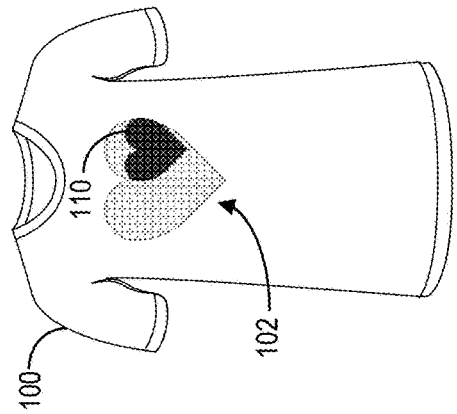

In various embodiments, different groups of the PDLC diffuser components 104 can be powered to create different pixelated designs. For example, FIG. 1C shows a small heart design 108 where only a few of the PDLC diffuser components 104 are activated (e.g., powered) in the transparent state. Further, in some embodiments, the PDLC diffuser components 104 can switch between different designs to create animations (e.g., based on a user providing touch input or triggering a switch). To illustrate, the clothing article 100 can animate a beating heart by alternating between the small heart design 108 shown in FIG. 1C and the medium heart design 110 shown in FIG. 1D.

As shown in FIGS. 1A-1D, the clothing article has a reflective background material behind the PDLC diffuser components 104. However, the material of the clothing article 100 can vary in substance, color, and design. For example, in some embodiments, the fabric material is a dark or colored fabric. In one or more embodiments, the fabric material has a printed or woven pattern that appears when the PDLC diffuser components 104 are in the transparent state.

Indeed, while a reflective material (e.g., a mirror-like material or a safety reflective material) will provide the high levels of diffusion when the PDLC diffuser components 104 are in a non-powered state, other material can be placed behind the PDLC diffuser components 104. In some cases, when a non-reflective material is behind the PDLC diffuser components 104 while in a non-powered state, the non-reflective material is partially visible as the PDLC diffuser components 104 do not fully diffuse the light passing through. In other cases, as described further below, multiple PDLC diffuser components 104 can be stacked on top of each other and the stack of PDLC diffuser components 104 can combine to fully diffuse or hide the non-reflective material hidden beneath.

As mentioned above, the PDLC diffuser components 104 can be attached (e.g., sewn, crimped, screwed, glued, taped) to the clothing article 100, or portions thereof. For example, the pattern 102 shown in FIGS. 1A-1D covers a portion of the shirt. In some cases, the clothing article 100 includes multiple groups and/or patterns of PDLC diffuser components. Further, as described below in connection with FIG. 7A, PDLC diffuser components can be tiled (e.g., adjacent to each other), scaled (e.g., partially overlapping one another), and/or stacked (e.g., fully overlapping one another).

As shown in FIGS. 1A-1D, the PDLC diffuser components 104 are arranged in a grid of rows and columns within the pattern 102. In various embodiments and as detailed below, each row and each column can be powered via a switch (e.g., an analog switch or a digital logic switch). In this manner, each of the PDLC diffuser components (e.g., a texture pixel or "texel") can be powered (e.g., switched to the transparent state) by the row and column switches corresponding to the row and column in which the PDLC diffuser component is located.

As mentioned above, in various embodiments, one or more of the PDLC diffuser components 104 can be touch activated. For example, a PDLC diffuser component can include a corresponding touch element that detects touch inputs. In response to a detected touch input, the PDLC diffuser component can toggle to the opposite state. Further, as described below, in response to detecting touch input at a specific PDLC diffuser component, a modular reflective light-diffuser system can create a design or display an animation by changing the states of multiple PDLC diffuser components.

In addition, in some embodiments, the modular reflective light-diffuser system can include hardware and/or software that facilitates sending and receiving data from an external source. For example, the modular reflective light-diffuser system receives designs, patterns, and/or animations to display on a set of modular reflective light-diffuser devices. For instance, the modular reflective light-diffuser system communicates with a phone application to receive one or more stored designs. Similarly, the modular reflective light-diffuser system can receive animations from a proximity beacon at an event (e.g., a concert or fashion show), from adjacent objects, or from other modular reflective light-diffuser devices (e.g., a fixed modular reflective light-diffuser device display or another individual wearing modular reflective light-diffuser devices). In various embodiments, the modular reflective light-diffuser system receives wireless transmissions (e.g., WI-FI, Bluetooth, NFC). In alternative embodiments, the modular reflective light-diffuser system downloads designs, patterns, and/or animations via a physical port (e.g., a data and recharging port). Further, the modular reflective light-diffuser system can receive one or more stored designs via flash memory, such as a SD card.

While the following disclosure relates to attaching PDLC diffuser components and modular reflective light-diffuser devices to clothing articles, the modular reflective light-diffuser device can be similarly attached to other objects, especially portable objects. For example, one or more modular reflective light-diffuser devices (corresponding to PDLC diffuser components) can be incorporated into other clothing items, such as jewelry, bags, shoes, belts, scarfs, and other accessories. Further, modular reflective light-diffuser devices can be added to cars and busses, walls, windows, signs, and other portable and non-portable objects of any size to create both small-format and large-format displays. Similarly, because of their small individual size and flexibility, modular reflective light-diffuser devices can mold to the shape of nearly any object or display, including curved surfaces (e.g., a dome or a sphere).

Figure 2B:
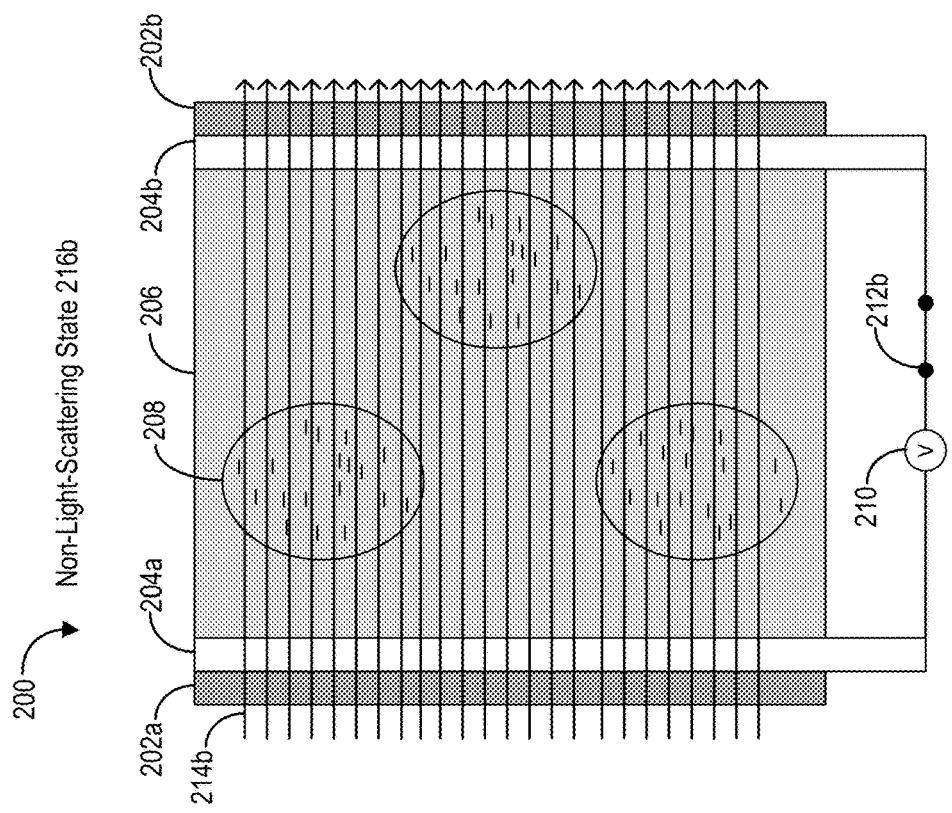
FIGS. 2A-2B illustrate example layers of a polymer dispersed liquid crystal (PDLC) component within a modular light-diffuser device in a light-scattering state and a non-light-scattering state, respectively, in accordance with one or more embodiments.
Figure 2A:
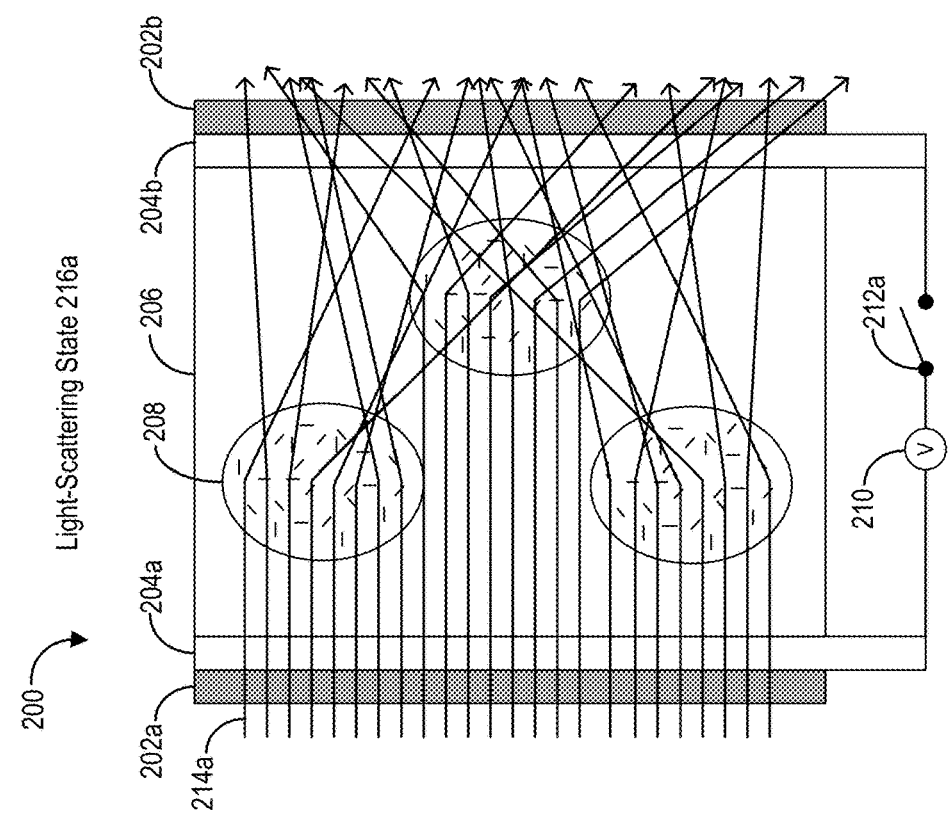

FIGS. 2A-2B illustrate example layers of a polymer dispersed liquid crystal (PDLC) diffuser component 200 associated with a modular reflective light-diffuser device in accordance with one or more embodiments. As shown, the PDLC diffuser component 200 includes polyethylene terephthalate (PET) film layers 202a, 202b. The PDLC diffuser component 200 also includes conductive coating layers 204a, 204b. Further, the PDLC diffuser component 200 includes a polymer layer 206 having dispersed liquid crystal molecules 208 (collectively called a "PDLC film layer" or "PDLC film").

In various embodiments, the PET film layers 202a, 202b serve as transparent boundaries that protect the inner layers of the PDLC diffuser component 200. The conductive coating layers 204a, 204b include transparent material that enables current to freely flow through it. In some embodiments, the conductive coating layers 204a, 204b include indium tin oxide (ITO). In many embodiments, the polymer layer 206 starts as a liquid that is infused with droplets of liquid crystal molecules 208, then cures into a solid material, holding in the liquid crystal molecules 208.

For purposes of explanation, the FIGS. 2A-2B include a power source 210 (e.g., capable of providing both positive voltage and connection to ground) coupled to a switch. When the switch is in an open state 212a, voltage is not applied to the PDLC diffuser component 200. As a result, the liquid crystal molecules 208 within the polymer layer 206 are randomly oriented and deflect (i.e., scatter) light rays 214a that attempt to pass through the PDLC diffuser component 200. Indeed, the PDLC diffuser component 200 is in a light-scattering state 216a, the PDLC diffuser component 200 can appear milky-white and diffuse.

When the switch is in the closed state 212b, current from the applied voltage of the power source 210 flows into the first coating layers 204a, through the polymer layer 206, into the second coating layer 204b, and back to the power source 210. As a result of voltage being applied, the liquid crystal molecules 208 align in an organized manner to let light rays 214b pass through. Indeed, when the PDLC diffuser component 200 is in a non-light-scattering state 216b, the PDLC diffuser component 200 can appear transparent, clear, or see through.

In many embodiments, the PDLC diffuser component 200 passively allows light to pass through it when in the non-light-scattering state 216b. More particularly, when the PDLC diffuser component 200 is in the non-light-scattering state 216b, light from outside passes through the transparent PDLC diffuser component 200, reflects off of the material behind the PDLC diffuser component 200 (e.g., clothing, fabric, a mirror), and then passes back through the transparent PDLC diffuser component 200. In general, passive components require less power, and thus, can be safer for users to wear and use. However, in some embodiments, the PDLC diffuser component 200 can include additional layers that provide light (e.g., active components), which can range from a faint glow to a bright light, depending on the type of layer and the amount of power supplied.

In various embodiments, the power source 210 and/or switch is provided via the modular reflective light-diffuser device and/or modular reflective light-diffuser system. For example, as described below, the modular reflective light-diffuser device configures power to flow multiple directions through the PDLC diffuser component 200. Further, switches (e.g., analog switches or logic switches) controlled by a modular reflective light-diffuser system can control the flow of power to the modular reflective light-diffuser system, and thus, the state of the PDLC diffuser component 200.

As mentioned above, the PDLC diffuser component 200 can be small in size and made of flexible, inexpensive material. Indeed, despite the PDLC diffuser component 200 including multiple layers, the PDLC diffuser component 200 can easily flex, bend, and move comparable to a thin piece of plastic. In this manner, when added to clothing, the PDLC diffuser component 200 can be worn without noticeably impeding the mobility of the user. Indeed, because of flexibility, when added to clothing, the PDLC diffuser component 200 can be nonrestrictive and comfortable to wear.

While a particular arrangement of layers is shown, in some embodiments, the PDLC diffuser component 200 can include additional, fewer, or different layers. For instance, one or both of the PET film layers 202a, 202b can be replaced with glass or another material. In addition, layers of the PDLC diffuser component 200 can be modified to create different light-scattering/transparency effects. For example, in various embodiments, the first PET film layer 202a can be divided into separate segments (e.g., cut into stripes). Further, each segment can be activated individually, creating a striped effect as the power is pulled down across the film layer (e.g., creating a "bar graph" effect).

Figure 2D:
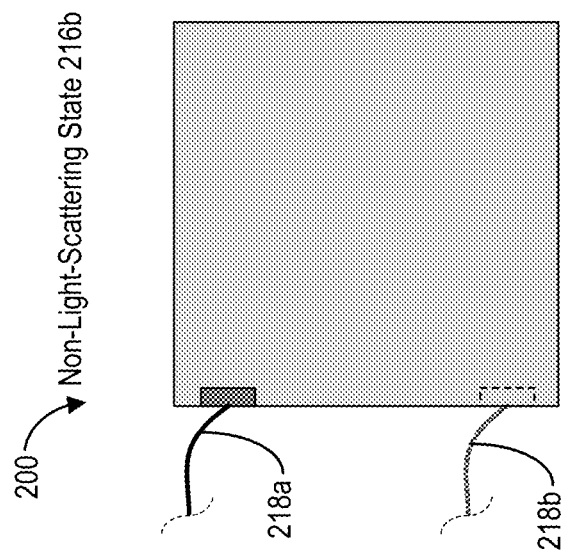
FIGS. 2C-2D illustrate examples of the PDLC diffuser component in a light-scattering state and a non-light-scattering state, respectively, in accordance with one or more embodiments.
Figure 2C:
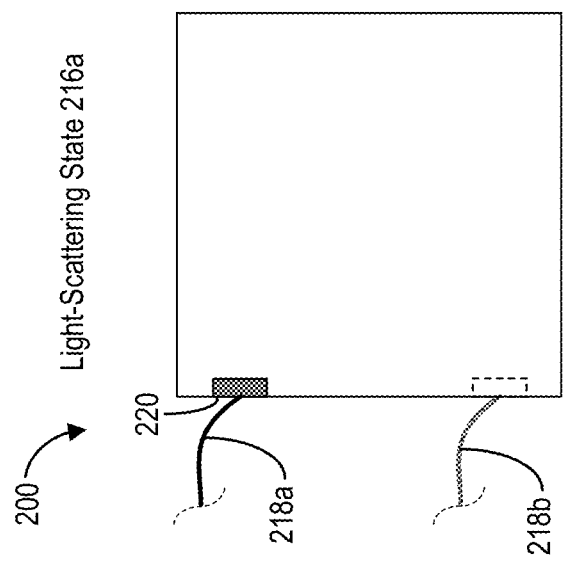

FIGS. 2C-2D illustrate examples of the PDLC diffuser component 200 in accordance with one or more embodiments. In particular, FIG. 2C shows the PDLC diffuser component 200 in the light-scattering state 216a. FIG. 2D shows the PDLC diffuser component 200 in the non-light-scattering state 216b. As shown, when in the light-scattering state 216a, the PDLC diffuser component 200 can appear white and diffuse. On the other hand, when in the non-light-scattering state, the PDLC diffuser component 200 can appear transparent. In one or more embodiments, a mirror or other reflective backing is positioned under the PDLC diffuser component 200. For example, in one or more embodiments, a mirror is positioned under the PDLC diffuser component 200. In such embodiments, when in the non-light-scattering state, the PDLC diffuser component 200 can appear silver.

As shown in FIGS. 2C-2D, the PDLC diffuser component 200 can include conductive elements 218a, 218b (e.g., traces, copper tape, conductive thread, wires, or other conductive material) that connect to the PDLC diffuser component 200. For example, the conductive elements 218a, 218b connect to the conductive coating layers 204a, 204b of the PDLC diffuser component 200. Accordingly, the conductive elements 218a, 218b can provide power to the PDLC diffuser component 200 from a power source 210, as described above. In addition, in various embodiments, the conductive elements 218a, 218b can connect to the conductive coating layers 204a, 204b via a bus bar 220.

As mentioned above, the PDLC diffuser component 200 can be connected to a corresponding modular reflective light-diffuser device. In general, there is a one-to-one ratio between modular reflective light-diffuser devices and PDLC diffuser components. Indeed, each modular reflective light-diffuser device provides power to a PDLC diffuser component causing it to change states. As also mentioned above, modular reflective light-diffuser devices can receive power from switches. In general, the number of switches is far fewer than the number of modular reflective light-diffuser devices.

While the PDLC diffuser components are visible when attached to an object, the corresponding modular reflective light-diffuser devices, switches, controllers, power source, and/or other components can be hidden. For example, when PDLC diffuser components are attached to a shirt, each modular reflective light-diffuser device can be hidden below or adjacent to its corresponding PDLC diffuser component. In some embodiments, the modular reflective light-diffuser device for a PDLC diffuser component can be located near the seam of a garment or in the bezel of an accessory (e.g., in a compact regular or flexible PCB). Similarly, the switches and other components can be hidden away from the PDLC diffuser components on or within the shirt.

Figure 3:
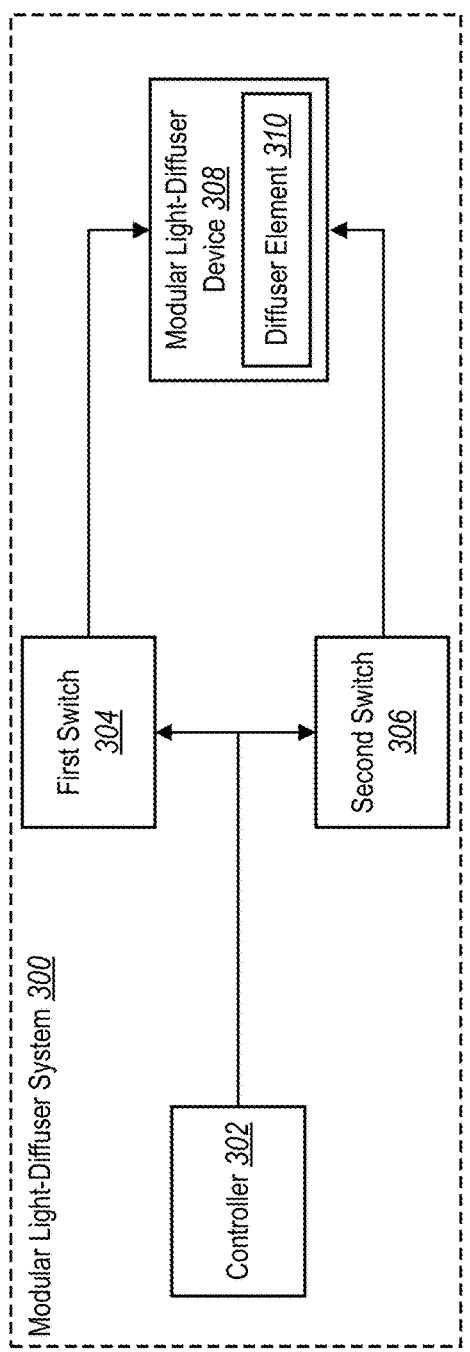
FIG. 3 illustrates schematic diagram of components for controlling a modular light-diffuser system in accordance with one or more embodiments.

FIG. 3 illustrates a schematic of a modular light-diffuser device in accordance with one or more embodiments. As shown, FIG. 3 illustrates the modular light-diffuser device 308 having a diffuser element 310. In one or more embodiments, the diffuser element 310 comprises a PDLC diffuser component having a PDLC diffuser film layer, as described above. As also shown, the modular light-diffuser device 308 is connected to a first switch 304 and a second switch 306, which are managed by a controller 302 (e.g., a microcontroller). While analog switches are shown that operate at 15 volts or higher, in one or more embodiments, digital logic switched can be utilized instead when the low-voltage power source is around 5 volts.

In various embodiments, the controller 302, the first switch 304, the second switch 306, and the modular light-diffuser device 308 are part of a modular light-diffuser system 300. For instance, the modular light-diffuser system 300 can change the state of the diffuser element 310 (e.g., between the light-scattering state and the non-light-scattering state) as well as provide generated alternating current to the diffuser element 310 based on sending signals to the analog switches via the controller 302. In some embodiments, the modular light-diffuser system includes additional analog switches and modular light-diffuser devices (e.g., a grid of modular light-diffuser devices controlled by switches).

In some embodiments, the controller 302 can provide a control signal to the analog switches to indicate when each switch should provide power to the modular light-diffuser device 308. In addition, the controller 302 can provide a synchronization clock to synchronize the switches with each other. For example, the controller utilizes a Serial Peripheral Interface (SPI) to provide input signals, power, clock signals, and other signals to the analog switches. In various embodiments, the controller 302 is a microprocessor having memory (e.g., RAM) and programmed instructions (e.g., in hardware or software) to manage the modular light-diffuser system.

Moreover, when activating the non-light-scattering state, as mentioned above, driving generated alternating current across the diffuser element 310 can extend the life of the diffuser element 310. However, the modular light-diffuser system 300 utilizes a direct current power source (e.g., a direct current power battery). Accordingly, in one or more embodiments, the controller 302 can enable the modular light-diffuser device 308 to generate alternating current from a direct current power source at the diffuser element 310 utilizing the first switch 304 and the second switch 306.

To illustrate, the modular light-diffuser device 308 receives power via the first switch 304 and provides electrical current in a first direction across the diffuser element 310 (i.e., from top to bottom). The modular light-diffuser device 308 receives power via the second switch 306 and provides electrical current in a second, opposing direction across the diffuser element 310 (i.e., from bottom to top). In this manner, while the two switches can draw power from the same direct current power source, the controller 302 can utilize the switches 304, 306 in a way that enables the modular light-diffuser device 308 to generate alternating current across the diffuser element 310, as if each switch is providing power from a separate inverted source.

More specifically, when activating the non-light-scattering state, the controller 302 provides a first instruction set that instructs the first switch 304 to provide voltage (e.g., 15 volts) to the modular light-diffuser device 308 as well as instructs the second switch 306 to provide ground (e.g., 0 volts) to the modular light-diffuser device 308. The controller 302 can also provide a second instructions set that instructs the second switch 306 to provide voltage and the first switch 304 to provide ground to the modular light-diffuser device 308.

Moreover, when activating the non-light-scattering state, the controller 302 can utilize a clock signal having a set frequency (e.g., 50 Hz) to determine when to alternate between the two switches. Indeed, the controller 302 can provide the first instruction set at a first time period (e.g., time interval) and the second instruction set at a second time period. The controller 302 can selectively provide instructions to the first switch 304 and the second switch 306 to continue alternating between the instructions sets to maintain the non-light-scattering state at the diffuser element 310. Then, the controller can instruct the switches 304, 306 to stop providing power to transition the modular light-diffuser device 308 to the light-scattering state.

In additional embodiments, different voltage and/or frequency can be applied to the modular light-diffuser device 308. For example, if the diffuser element 310 becomes transparent at 15 volts, applying a higher voltage can achieve the same effect. However, applying a lower voltage, in some embodiments, causes the diffuser element 310 to become partially transparent. Thus, in these embodiments, the modular light-diffuser system 300 can utilize different lower voltages to achieve different grayscale or transparency levels for the diffuser element 310. Similarly, in various embodiments, the modular light-diffuser system can vary the grayscale or transparency levels of the diffuser element 310 by modulating the duty cycle (pulse width modulation, PWM) and/or the frequency (e.g., less than 50 Hz).

Figure 4:
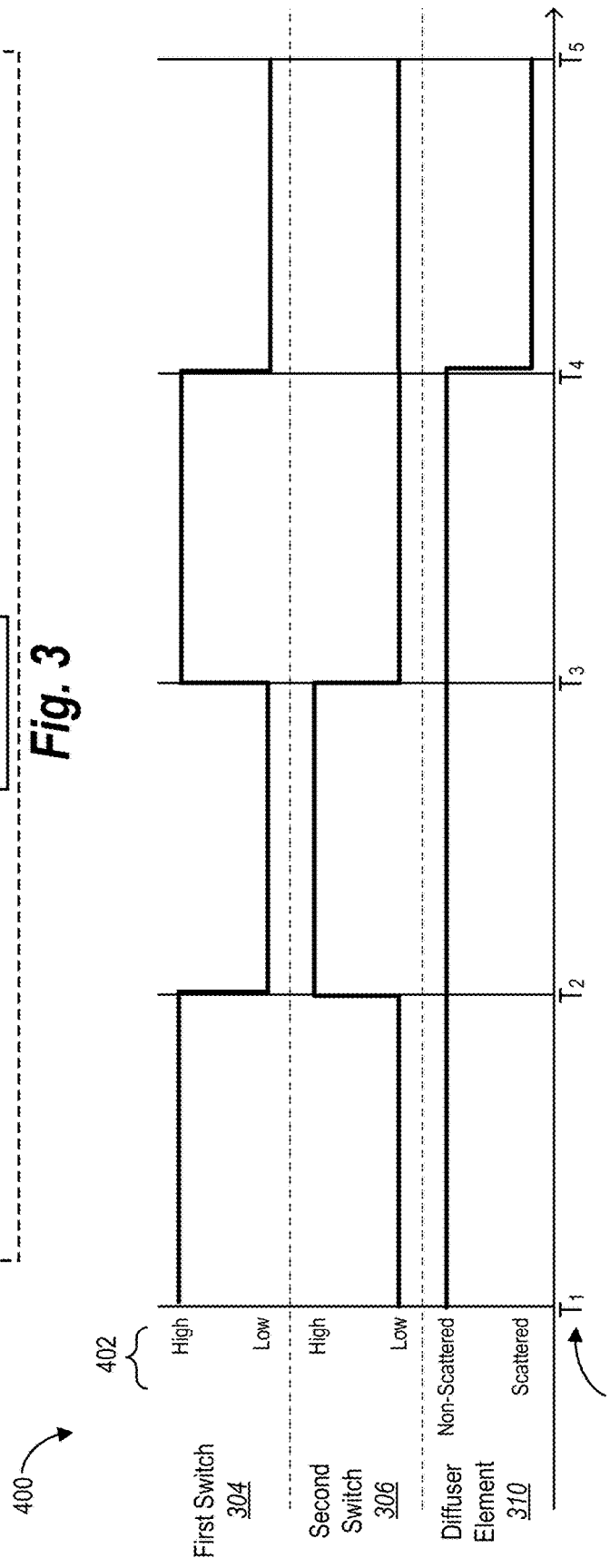
FIG. 4 illustrates an example timing diagram of state changes for the modular light-diffuser device in accordance with one or more embodiments.

To further illustrate, FIG. 4 shows a simplified timing diagram 400 of state changes for the diffuser element 310 of the modular light-diffuser device 308 in accordance with one or more embodiments. As shown, the timing diagram 400 includes the first switch 304, the second switch 306, and the diffuser element 310. In addition, the simplified timing diagram 400 includes the state 402 of each component or element at different time periods 404. As mentioned above, in various embodiments, the controller 302 can provide instructions to the first switch 304 and the second switch 306 to set the state 402 of each switch.

As shown, the first switch 304 and the second switch 306 include a high state and a low state. In general, the high state corresponds to providing positive voltage and the low state corresponds to providing ground to the modular light-diffuser device 308. While one switch can provide both positive voltage and ground at the same time, the simplified timing diagram 400 does not account for these situations. As also shown, the diffuser element 310 includes the scattered state (i.e., light-scattering state) and the non-scattered state (i.e., non-light-scattering state).

At the first time period (i.e., T1), the first switch 304 is in the high state (e.g., providing positive voltage) and the second switch 306 is in the low state (e.g., providing ground or negative voltage), which causes the diffuser element 310 to activate the non-light-scattering state (e.g., a transparent state). At the second time period (i.e., T2), the first switch 304 switches to the low state and the second switch 306 switches to the high state, which allows the diffuser element 310 to remain in the non-light-scattering state. Indeed, while the switches provide power to the diffuser element 310 over the first time period (i.e., T1) and the second time period (i.e., T2) at the same current and the same voltage differential, the switches are reversing the directional flow of power (e.g., reversing the polarity) through the diffuser element 310. The third time period (i.e., T3) shows the first switch 304 and the second switch 306 switching back to the same states as the first time period (e.g., switches back to the first polarity). Again, the diffuser element 310 maintains the non-light-scattering state in the third time period.

At the fourth time period (i.e., T4), both the first switch 304 and the second switch 306 are in the low state, meaning that both switches are providing ground only such that no power is being provided to the modular light-diffuser device 308. Accordingly, the diffuser element 310 switches to the scattered state and becomes diffuse.

As mentioned above, in various embodiments, the frequency can be 50 Hz or greater. In these embodiments, the two switches can provide generated alternating current to the diffuser element 310 at a rate that is not recognizable by a user. Further, at this frequency, the diffuser element 310 can facilitate near-instantaneous changes between the light-scattering state and the non-light-scattering state, as mentioned above. Also, as described below, in some embodiments, when power is initially provided or stopped, the diffuser element 310 can fade on or off into a non-light-scattering state based on the rate at which power is provided or cut off.

Figure 5B:
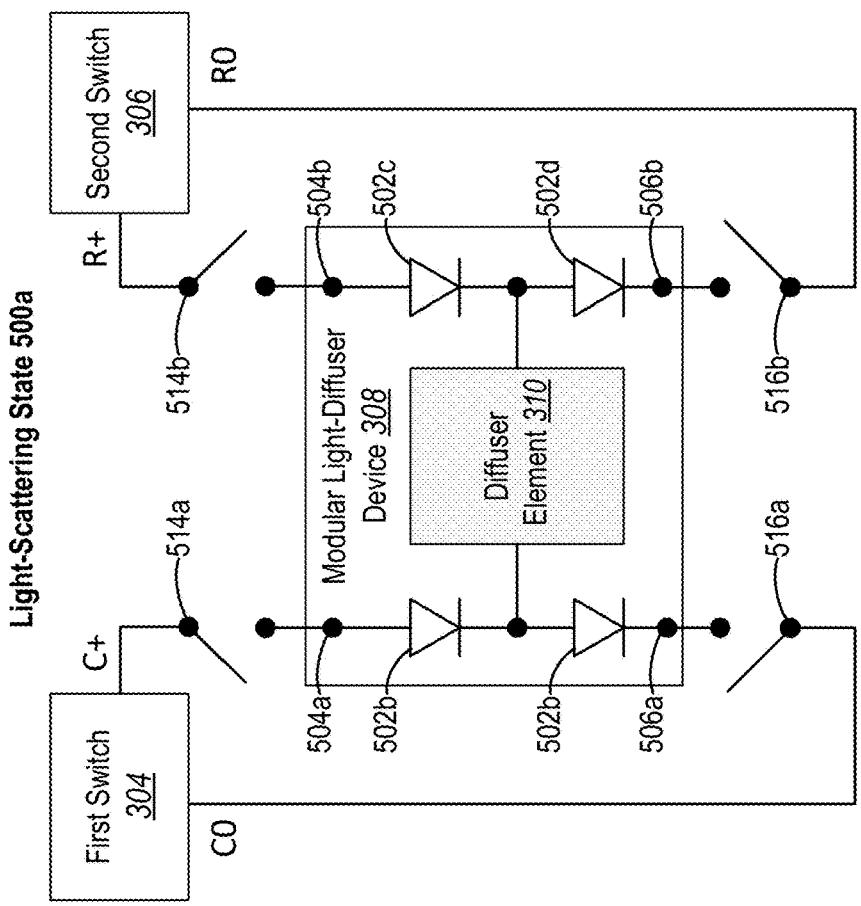
Figure 5A:
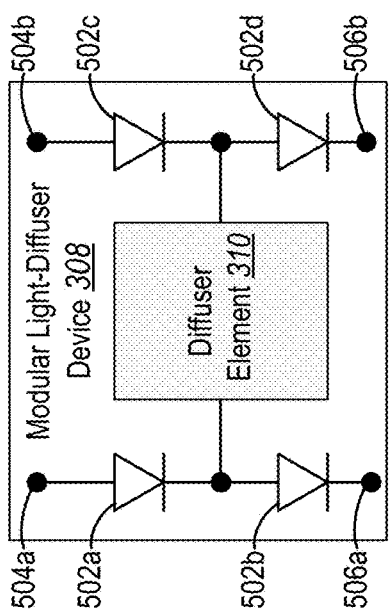

While FIG. 3 includes a simplified modular light-diffuser device 308, FIGS. 5A-5D illustrate a more detailed example of the modular light-diffuser device 308. In particular, FIG. 5A shows elements of the modular light-diffuser device 308 including the diffuser element 310. Further, FIGS. 5B-5D show configurations of the modular light-diffuser device 308 as it switches between the light-scattering state and the non-light-scattering state.

As shown in FIG. 5A, the modular light-diffuser device 308 includes a first diode 502a, a second diode 502b, a third diode 502c, and a fourth diode 502d. In addition, the modular light-diffuser device 308 includes a first input 504a (e.g., a contact pad or other conductive element) and a second input 504b (e.g., a contact pad or other conductive element). The modular light-diffuser device 308 also includes a first output 506a (e.g., a contact pad or other conductive element) and a second output 506b (e.g., a contact pad or other conductive element).

In one or more embodiments, the diodes, inputs, and outputs can be connected together on a regular or flexible PCB or via another medium as shown. For example, as shown, the first input 504a, the first diode 502a, the second diode 502b, and the first output 506a can be serially connected on a PCB as shown and make up a first set of elements. Likewise, the second input 504b, the third diode 502c, the fourth diode 502d, and the second output 506b can be also serially connected on the PCB as shown and make up a second set of elements.

As illustrated in FIG. 5A, the diffuser element 310 is located between the two sets of elements on the modular light-diffuser device 308. For example, the diffuser element 310 connects to both the first set of elements and the second set of elements. Notably, while the diffuser element 310 is shown along with the other elements of the modular light-diffuser device 308, in many embodiments, the diffuser element 310 is located separately from the two sets of elements (e.g., connected via conductive materials or other conductive elements).

To illustrate, the diffuser element 310 is connected to the first set of elements between the first diode 502a and the second diode 502b (i.e., the diffuser element 310 is connected to the output of the first diode 502a). For example, a first conductive coating layer (e.g., top layer) of the diffuser element 310 can be connected between the first diode 502a and the second diode 502b. Additionally, the diffuser element 310 is connected to the second set of elements between the third diode 502c and the fourth diode 502d (i.e., the diffuser element 310 is connected to the output of the third diode 502c). For example, a second conductive coating layer (e.g., bottom layer) of the diffuser element 310 can be connected between the third diode and the fourth diode.

As previously mentioned, conductive materials or conductive elements can connect the diffuser element 310 to the other elements of the modular light-diffuser device 308. For example, a first conductive element (e.g., copper tape) connects the first conductive coating layer of the diffuser element 310 to the first set of elements of the modular light-diffuser device 308. Likewise, a second conductive element connects a second conductive coating layer of the diffuser element 310 to the second set of elements of the modular light-diffuser device 308. As provided above in connection with FIG. 3, the two conductive coating layers can be located on opposite sides of a PDLC film layer.

As mentioned above, the modular light-diffuser device 308 includes multiple diodes. Generally, a diode ensures that current flows in a single direction. Indeed, because power can flow in multiple directions along various connections, the diodes control the flow of current (e.g., power) in a desired direction. As shown in the modular light-diffuser device 308, the diodes direct the power to flow from the inputs to the outputs (e.g., from top to bottom or vice versa).

In one or more embodiments, the diodes are non-LED diodes that control the flow of current. In alternative embodiments, one or more of the diodes are LED diodes and/or additional LED diodes can be added to the diffuser element 310. In these embodiments, the LED diodes on the diffuser element 310 can add a colored effect. For example, in some embodiments, an LED diode adds a slight glow to the diffuser element 310. Indeed, in some embodiments, an additional layer, such as an OLED-based layer can be added to the diffuser element 310 to emit light from the diffuser element 310.

Turning to FIGS. 5B-5D, these figures show the how the switches can provide power to the modular light-diffuser device 308. Accordingly, FIGS. 5B-5D show the first switch 304 and the second switch 306, which are described above. When the switches are not providing power to the modular light-diffuser device 308, the diffuser element 310 maintains the light-scattering state, as shown in FIG. 5B. However, when the switches are applying power (e.g., by changing the direction of the electrical polarity), the modular light-diffuser device 308 activate the non-light-scattering state, as shown in FIGS. 5C-5D.

As shown, the switches each provide access to a positive voltage source (e.g., C+ and R+) as well as a ground source (e.g., C0 and R0). As mentioned above, in one or more embodiments, the positive voltage output can be 15 volts or more while the ground output is 0 volts. As mentioned previously, the positive voltage source can be up to 30 volts. Additionally, in some embodiments, the ground output is a negative voltage, such as −15 volts. Indeed, in the example embodiment, the voltage differential between the positive voltage output and the ground output is 15 volts. However, the voltage differential can be higher or lower (e.g., ranging between 3 volts and 60 volts or anywhere between +/−30 volts).

In addition, the switches are each associated with a positive voltage source gate (i.e., switch) and a ground drain gate. More particularly, the first switch 304 has a first positive gate 514a that controls access to the positive voltage source C+ as well as a first ground gate 516a that controls access to the ground source C0. Similarly, the second switch 306 has a second positive gate 514b that controls access to the positive voltage source R+ as well as a second ground gate 516b that controls access to the ground source R0. While the positive gates and ground gates are shown as external switches, in many embodiments, these gates are located and controlled internally within a corresponding switch (e.g., an analog switch).

As shown in FIG. 5B, the first positive gate 514a, the second positive gate 514b, the first ground gate 516a, and the second ground gate 516b are each open. Because each of the gates are open, the switches are not providing power to the diffuser element 310. Accordingly, the diffuser element 310 is in the light-scattering state 500a such that light is scattered as it passes through the PDLC film layer of the diffuser element 310 making it more difficult to see through.

FIGS. 5C-5D show sample configurations of the modular light-diffuser device 308 in the transparent state. To illustrate, in FIG. 5C, the first switch 304 closes the first positive gate 514a while opening the first ground gate 516a. In addition, the second switch 306 opens the second positive gate 514b while closing the second ground gate 516b.

As shown, in this configuration, power (e.g., current) flows from the positive voltage source C+ provided via the first switch 304 to the ground source R0 of the second switch 306 in a completed circuit path (e.g., in a first electrical polarity direction). Indeed, the applied power is visually represented by the bolded line and the direction of the flowing current is shown by the arrows between elements. Specifically, as shown, positive power enters the modular light-diffuser device 308 at the first input 504a, flows down through the first diode 502a, across the diffuser element 310 in a first direction (e.g., left to right or top to bottom), down through the fourth diode 502d, and out through the second output 506b (e.g., ground). In other words, the current flows through a first circuit path through the diffuser component 310 comprising the first diode 502a and the fourth diode 502d. As the power passes through the diffuser element 310 in the first direction, it aligns the liquid crystal molecules in the PDLC film layer such that the diffuser element 310 activates a first non-light-scattering state 500b (e.g., a transparent state).

To allow current to flow in the opposite direction across the diffuser element 310 (e.g., to reverse the electrical polarity direction), the switches can change to a different configuration. To illustrate, in FIG. 5D, the first switch 304 opens the first positive gate 514a while closing the first ground gate 516a. In addition, the second switch 306 closes the second positive gate 514b while opening the second ground gate 516b.

In this updated configuration, current flows from the positive voltage source R+ provided via the second switch 306 to the ground source C0 of the first switch 304 in a completed circuit path, which activates a second non-light-scattering state 500c (e.g., a transparent state) for the diffuser element 310. More particularly, current enters the modular light-diffuser device 308 at the second input 504b, flows down through the third diode 502c, across the diffuser element 310 in a second direction (e.g., right to left or bottom to top), down through the second diode 502b, and out through the first output 506a. In other words, the current flows through a second circuit path through the diffuser component 310 comprising the third diode 502c and the second diode 502b (e.g., in a second, opposite, or reverse electrical polarity direction). Indeed, as shown in FIG. 5D, the current flows in a second direction across the diffuser element 310 that is opposite to the first direction of current flow shown in FIG. 5C.

As described above, a modular light-diffuser system can instruct the first switch 304 and the second switch 306 to alternate open and closed outputs to toggle the modular light-diffuser device 308 between the first non-light-scattering state 500b (FIG. 5C) and the second non-light-scattering state 500c (FIG. 5D). For example, the modular light-diffuser system instructs the gates to alternate between the two electrical polarity directions at each clock cycle. In this manner, the modular light-diffuser device 308, along with the inputs from the two switches can provide generated alternating current to the diffuser element 310 at a rate of a given frequency based on switching the electrical polarity directions.

After a period of time or based on an event, the modular light-diffuser system can instruct the first switch 304 and the second switch 306 to stop providing power (e.g., create an open circuit) and/or to provide ground to the modular light-diffuser device 308 to return the diffuser element 310 to the light-scattering state 500a. To illustrate, FIGS. 5E-5H show various configurations of the modular light-diffuser device 308 in the light-scattering state, which are described in detail below.

Figure 5F:
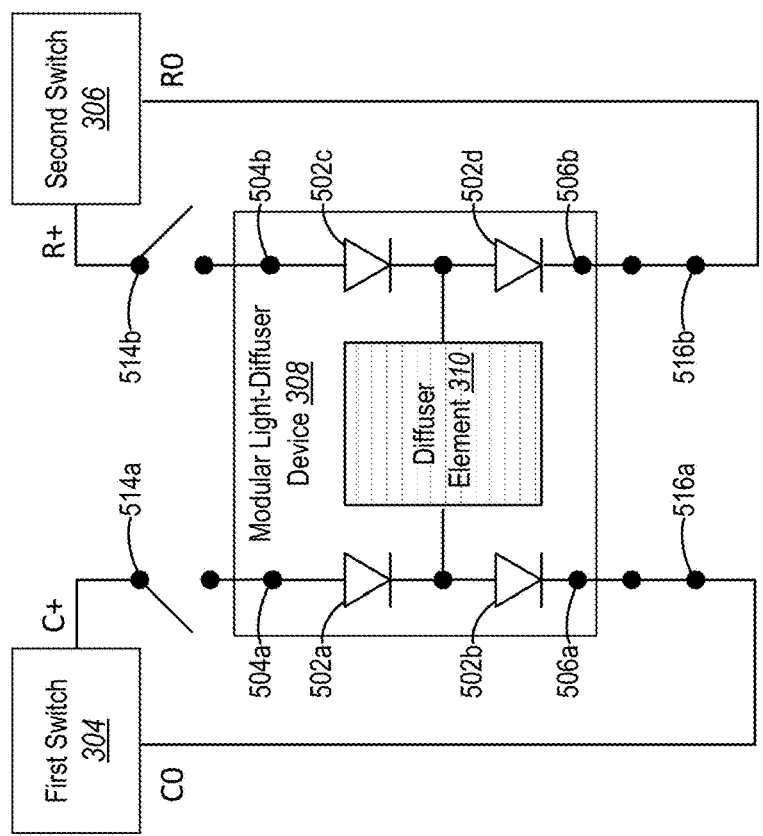
Figure 5E:
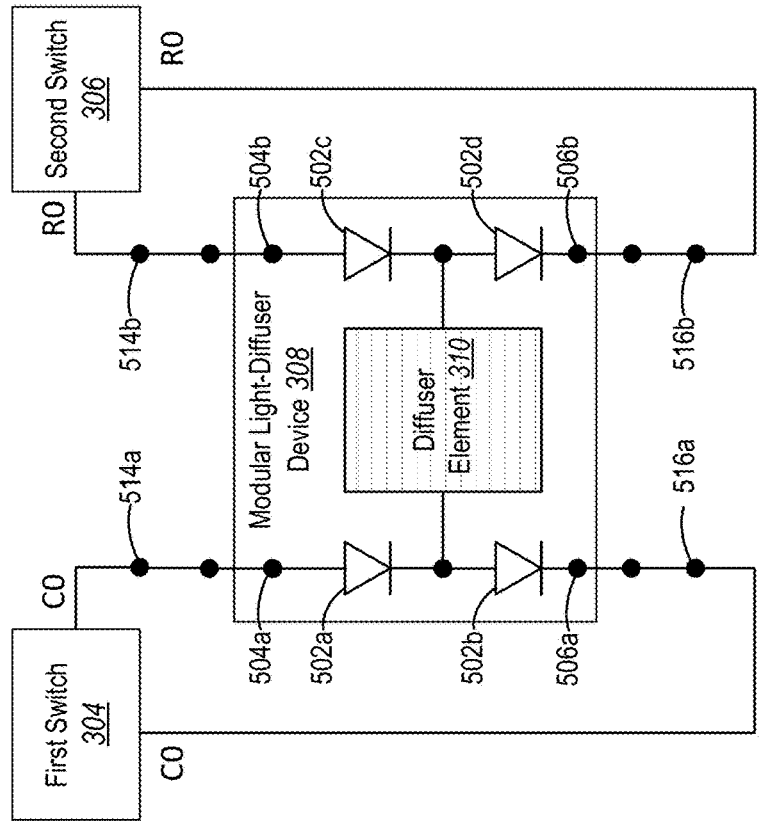

As shown in FIG. 5E, the modular light-diffuser system instructs the first switch 304 and the second switch 306 to fully ground the modular light-diffuser device 308. Indeed, where the first switch 304 and the second switch 306 were previously providing positive power to the modular light-diffuser device 308 (e.g., via the first input 504a and the second input 504b), the first switch 304 and the second switch 306 change to provide zero volts (i.e., ground). Further, the first switch 304 and the second switch 306 can also provide and/or maintain ground to the first output 506a and the second output 506b of the modular light-diffuser device 308.

More particularly, as shown in FIG. 5E, the modular light-diffuser device 308 can transition the modular light-diffuser device 308 to the light-scattering state 500d by providing ground (i.e., 0 volts) to the first input 504a, the second input 504b, the first output 506a, and the second output 506b. In this manner, any residual or leaky current is instantly discharged from the PDLC film layer of the diffuser element 310 and the modular light-diffuser device 308 immediately transitions to the light-scattering state 500a. Indeed, when transitioning multiple modular light-diffuser devices in a pattern, swatch, or group of devices, the modular light-diffuser system can ensure that all of the modular light-diffuser devices concurrently transition to the light-scattering state by fully grounding all of the devices.

In some embodiments, the modular light-diffuser system can cause the outputs to be set to ground to achieve the light-scattering state. To illustrate, FIG. 5F shows the modular light-diffuser device 308 in a light-scattering state 500e. In particular, FIG. 5F shows the modular light-diffuser system instructing the first switch 304 and the second switch 306 to create open circuits with respect to the first input 504a and the second input 504b as well as to provide ground to the first output 506a and the second output 506b of the modular light-diffuser device 308. In this manner, the modular light-diffuser device 308 quickly discharges the modular light-diffuser device 308 into the light-scattering state 500e.

In one or more embodiments, the modular light-diffuser system can discharge the modular light-diffuser device 308 by causing one of the switches to provide ground in place of providing positive power. To illustrate, FIG. 5G shows the first switch 304 providing ground to the first input 504a of the modular light-diffuser device 308 in place of positive voltage (or an open circuit). For example, if the modular light-diffuser device 308 is in the non-light-scattering state 500b (show in FIG. 5C) where the first switch 305 was providing positive power to the first input 504a, the modular light-diffuser system can cause the first switch 304 to change and provide ground to the first input 504a, which cuts off positive power as well as causes any positive power at the first input 504a to go to ground rather than travel across the diffuser element 310. By proving ground to the first input 504a, the modular light-diffuser system can toggle the modular light-diffuser device 308 to the light-scattering state 500f.

Similar to FIG. 5G, FIG. 5H shows the modular light-diffuser system causing the second switch 306 to provide ground to the second input 504b of the modular light-diffuser device 308. For example, if the modular light-diffuser device 308 is in the non-light-scattering state 500c (show in FIG. 5D), the modular light-diffuser system can instruct the second switch 306 to cut off positive power and provide ground to the second input 504b, which causes positive power at the second input 504b to go to ground and quickly transition the modular light-diffuser device 308 to a light-scattering state 500g.

In various embodiments, the modular light-diffuser system instructs the first switch 304 and the second switch 306 to stop providing power to the modular light-diffuser device 308 and allow the diffuser element 310 to fade from a transparent state to the light-scattering state 500a (or vice versa when initially providing power). For example, in some cases, the modular light-diffuser device 308 (i.e., the diffuser element 310) acts as a capacitor and gradually discharges the power and fading back to the diffused light-scattering state 500a at a random time interval (e.g., based on how gradually the power source is cut off). Thus, by changing how power is discharged from the modular light-diffuser device 308, as described above, the modular light-diffuser system can transition the modular light-diffuser device 308 back to the light-scattering state at different speeds (and vice versa).

In addition to providing generated alternating current to a single modular light-diffuser device, a modular light-diffuser system can provide generated alternating current to multiple modular light-diffuser devices via a set of switches. Further, in many embodiments, the modular light-diffuser system can utilize a few switches to activate a large number of modular light-diffuser devices. Indeed, in many embodiments, the modular light-diffuser device 308 can reuse the same switch to control (or partially control) many modular light-diffuser devices.

Figure 6A:
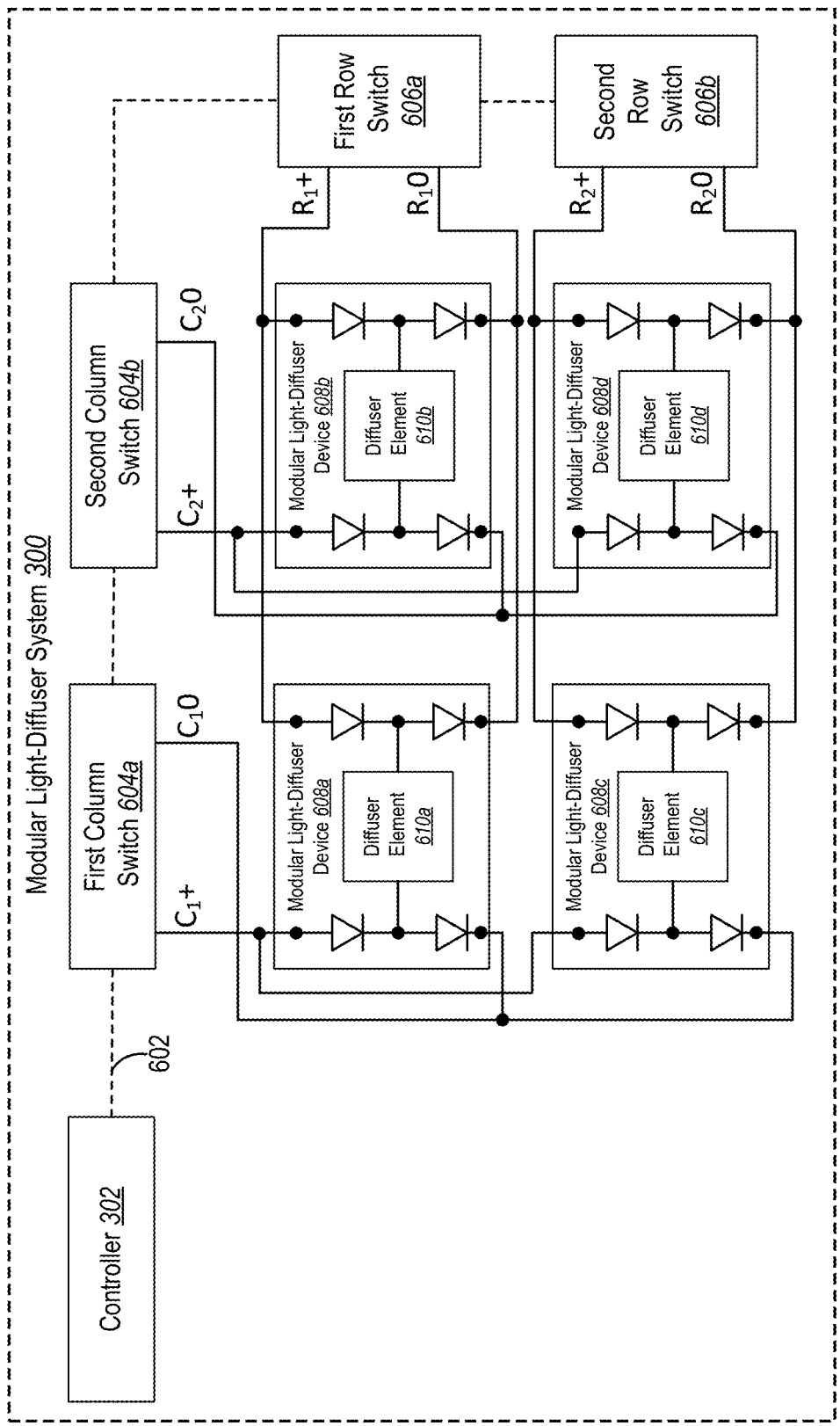
FIGS. 6A-6C illustrate examples of multiple modular light-diffuser devices arranged in rows and columns in accordance with one or more embodiments.
Figure 6B:
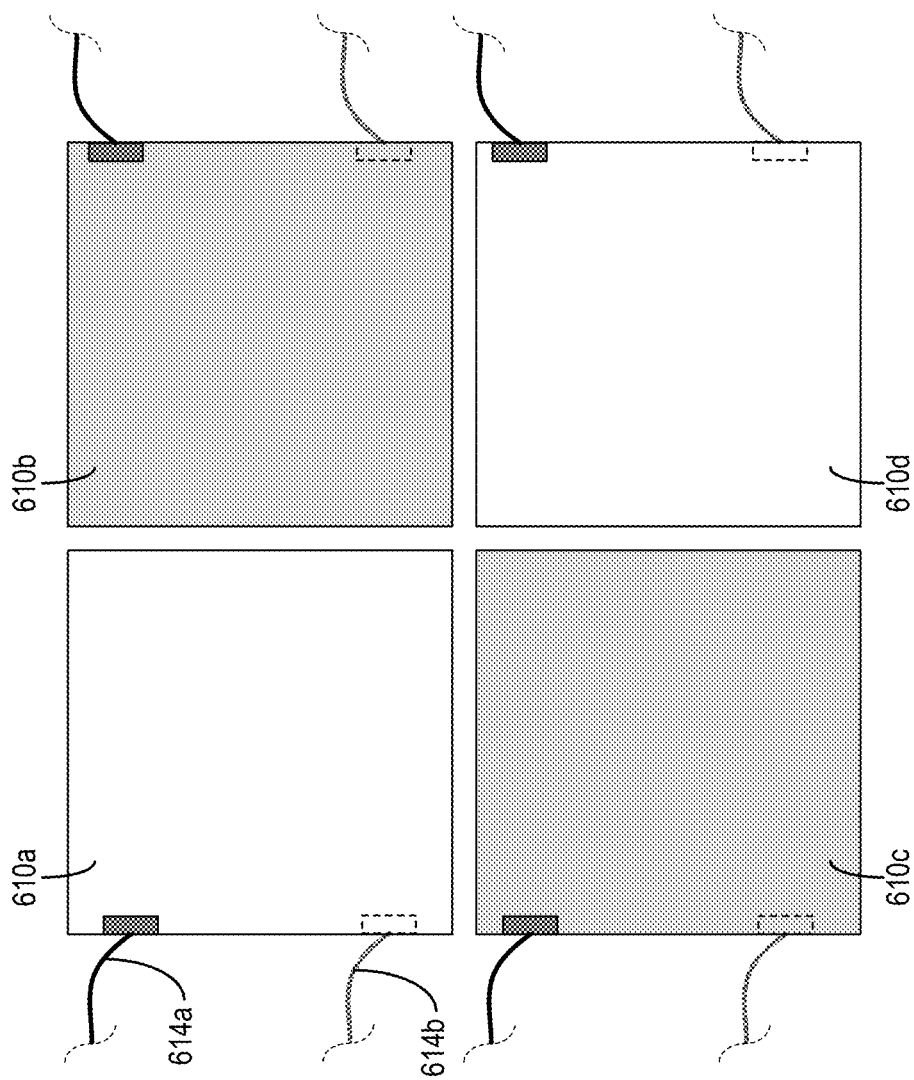
Figure 6C:
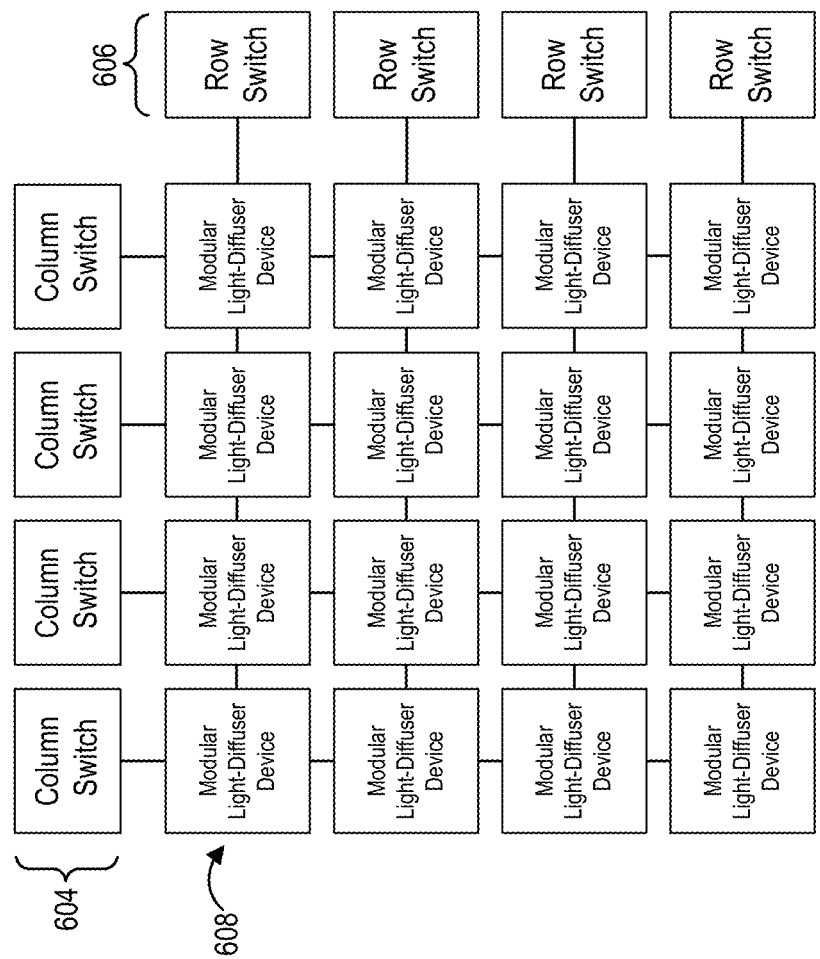

To illustrate, FIGS. 6A-6C show examples of multiple modular light-diffuser devices (e.g., a swatch) arranged in a grid of rows and columns in accordance with one or more embodiments. In particular, FIG. 6A illustrates a schematic diagram of a modular light-diffuser system controlling four modular light-diffuser devices. FIG. 6B illustrates a grid of PDLC components (e.g., diffuser elements) organized in a similar configuration to the arrangement as in FIG. 6C. FIG. 6C illustrates a schematic diagram efficiently utilizing eight switches to control sixteen modular light-diffuser devices.

As shown, FIG. 6A includes the modular light-diffuser system 300 having the controller 302, a first column switch 604a, a second column switch 604b, a first row switch 606a, a second row switch 606b, and four modular light-diffuser devices 608a-608d that include corresponding diffuser elements 610a-610d. In various embodiments, the column switches 604a-604b each correspond to the first switch 304 described above with respect to FIG. 5B. Similarly, the row switches 606a-606b can each correspond to the second switch 306 described above with respect to FIG. 5B. Further, the modular light-diffuser devices 608a-608d can each correspond to the modular light-diffuser device 308 and the diffuser elements 610a-610d can each correspond to the diffuser element 310, which are described above with respect to FIG. 5B.

As mentioned above, the modular light-diffuser devices 608a-608d are arranged into a grid of rows and columns. As shown, each column of modular light-diffuser devices is associated with a column switch, and each row of modular light-diffuser devices is associated with a row switch. In this manner, the modular light-diffuser system 300 can efficiently utilize the same column switch to provide a portion of power to each of the modular light-diffuser devices located in the column and similarly with each row switch. Indeed, the modular light-diffuser system 300 utilizes the switches in combination to provide positive, ground, and open inputs (e.g., high, low, and open inputs) to efficiently control multiple modular light-diffuser devices and the generated alternating current applied through corresponding diffuser elements 610a-610d, as detailed above.

In various embodiments, each of the modular light-diffuser devices 608a-608d can be powered into the non-light-scattering state based on a column switch and a row switch providing power and ground (or vice versa) and at the same time. As shown, each of the switches can provide access to a positive power source (i.e., $C_1+$, $C_2+$, $R_1+$, and $R_2+$) and a ground drain (i.e., $C_10$, $C_20$, $R_10$, and $R_20$) as well as cause an open circuit. Additionally, in one or more embodiments, each of the modular light-diffuser devices 608a-608d can be activated into a non-light-scattering state when a column switch provides positive power and a row switch provides ground (and vice versa), as described above with respect to FIGS. 5B-5D.

To illustrate, the modular light-diffuser device 608a can provide received generated alternating current to diffuser element 610a based on power provided via the first column switch 604a and the first row switch 606a. Similarly, the modular light-diffuser device 608b can provide generated alternating current to diffuser element 610b based on power provided via the second column switch 604b and the first row switch 606a. Likewise, the modular light-diffuser device C 608c can provide generated alternating current to diffuser element C 610c based on power provided via the first column switch 604a and the second row switch 606b. Further, the modular light-diffuser device D 608d can provide generated alternating current to diffuser element D 610d based on power provided via the second column switch 604b and the second row switch 606b. Then, to transition any of the modular light-diffuser devices 608a-608d back to the light-scattering state, the switches can provide ground to the inputs and outputs of the modular light-diffuser device, as described above.

As shown, the controller 302 can provide a control signal 602 to the switches. In various embodiments, the controller 302 provides the control signal 602 to the switches via a serial bus (e.g., using a SPI). In alternative embodiments, the controller 302 provides the control signal 602 to two or more switches via parallel connections. In some embodiments, the controller 302 can provide the control signal directly to each of the modular light-diffuser devices 608a-608d. In such embodiments, while each of the modular light-diffuser devices 608a-608d would need to connect to two switches, the modular light-diffuser devices 608a-608d would not need to form a strict grid arrangement.

In one or more embodiments, the controller 302 can activate and deactivate each of the modular light-diffuser devices 608a-608d independently utilizing the corresponding row and column switches. In alternative embodiments, the modular light-diffuser system 300 provides power (or ground) to all of the modular light-diffuser devices on a per column or per row basis. For example, the modular light-diffuser system 300 provides power (or ground) in a column while using the separate row switches to activate (or deactivate) target modular light-diffuser devices in the corresponding row. In these embodiments, the controller 302 can more efficiently activate multiple modular light-diffuser devices in a shorter amount of time, especially when activating multiple modular light-diffuser devices in the same column. Further, the controller 302 apply the same principles by switching the controls of the row and column switches.

In various embodiments, the controller 302 utilizes the control signal 602 to coordinate the activation of each of the modular light-diffuser devices 608a-608d. For example, the controller 302 can selectively provide low voltage power to the light-diffuser module devices via the switches to maintain the light-diffuser module devices in the non-light scattering state by alternating the provided low voltage power between column analog switches and row analog switches. In addition, the controller 302 can selectively provide an open circuit or ground to the light-diffuser module devices via the switches to maintain the light-diffuser module devices in the light-scattering state.

More particularly, the modular light-diffuser system 300 can utilize the controller 302 and the control signal 602 to individually provide power to each of the modular light-diffuser devices 608a-608d by identifying the column switch and row switch to which the modular light-diffuser device belongs, and indicating in the control signal 602 for those identified switches to provide power at the same time. In some embodiments, the control signal 602 instructs the identified switches to alternate between providing positive power and ground such that the modular light-diffuser device can drive generated alternating current across its diffuser element, as described above.

When arranged into a grid of rows and columns, the modular light-diffuser devices 608a-608d can form a dense dot matrix of pixels, where each of the diffuser elements 610a-610d represents a pixel. Indeed, the controller 302 can activate and deactivate each pixel by controlling whether the pixel appears white and cloudy (e.g., in the light-scattering state) or appears transparent revealing the material beneath (e.g., in the non-light-scattering state). By activating and deactivating pixels (i.e., diffuser elements 610a-610d) via the controller 302, the modular light-diffuser system 300 can create visual designs and patterns. Further, the modular light-diffuser system 300 can update the pixels (i.e., diffuser elements 610a-610d) over time to create animations.

In various embodiments, the controller 302 can include memory (e.g., RAM) to represent pixel values for each of the modular light-diffuser devices 608a-608d. For example, the controller 302 maintains a table of values indicating the current state (e.g., the current pixel value) of each of the modular light-diffuser devices 608a-608d. Further, in some embodiments, the controller 302 stores additional pixel values corresponding to one or more designs and/or animations. In this manner, the modular light-diffuser system 300 can create a target design and/or animation by updating the current pixel values of the modular light-diffuser devices 608a-608d to match the stored pixel values corresponding to the target design and/or animation.

In one or more embodiments, the modular light-diffuser system activates each modular light-diffuser device independently. For example, when the first two modular light-diffuser devices are in the non-light-scattering state at the same time, the modular light-diffuser system provides power to modular light-diffuser device 608a at a first and second clock cycle (e.g., alternative positive and ground power) as well as a fifth and sixth clock cycle. The modular light-diffuser system 300 can then provide power to the modular light-diffuser device 608b at a third and fourth clock cycle as well as a seventh and eight clock cycle. If the clock cycle is operating at or above 50 Hz, then the two modular light-diffuser devices appear to be activated at the same time. In some embodiments, the modular light-diffuser system 300 can rotate between modular light-diffuser devices every clock cycle and provide generated alternating current to a modular light-diffuser device every other time it receives power.

FIG. 6B illustrates examples of the diffuser elements 610a-610d (e.g., pixels) corresponding to the modular light-diffuser devices 608a-608d shown in FIG. 6A. As mentioned above, each of the diffuser elements 610a-610d can represent the PDLC diffuser component 200 described above with respect to FIGS. 2A-2D. Indeed, each of the diffuser elements 610a-610d can match the PDLC diffuser component 200 shown in FIGS. 2C-2D.

As shown, the diffuser elements 610a-610d are arranged in a grid layout of columns and rows. Further, diffuser element 610a and diffuser element D 610d are shown in the light-scattering state (e.g., FIG. 2C) while the diffuser element 610b and diffuser element C 610c are shown in the non-light-scattering state (e.g., FIG. 2D). As described above, a modular light-diffuser system 300 can control switches to activate (e.g., provide power) and deactivate (e.g., cut power or provide ground) the non-light-scattering state of each of the diffuser elements 610a-610d.

As also shown, the diffuser elements 610a-610d are tiled or arranged next to each other to form a dense dot matrix of pixels. In some embodiments, one or more of the pixels include multiple PDLC film layers and/or multiple diffuser elements stacked on top of each other, which can enable the pixel to display different levels of opacity/transparency (e.g., from white to a black background material or from white to silver). In various embodiments, the pixels are partially stacked on top of each other, forming a scaled appearance. Other arrangements, layouts, and stacking patterns can be utilized to create various visual effects based on the pixels when added to objects (e.g., clothing).

In FIG. 6B, each of the diffuser elements 610a-610d includes two conductive elements 614a-614b. As described above, a diffuser element is connected to a modular light-diffuser device via the conductive element 614a-614b (or another connection medium). For example, the first conductive element 614a connects to the first set of elements of the modular light-diffuser device and the second conductive element 614b connects to the second set of elements of the modular light-diffuser device, as described above. Accordingly, in this configuration, the same column switch can efficiently utilize the first conductive element 614a to provide positive power and ground, at alternating clock cycles based on the frequency (e.g., 50 Hz), to the diffuser element (via the first set of element of the modular light-diffuser device) while the same row switch can efficiently utilize the second conductive element 614b to respectively provide ground and positive power to the diffuser element.

In one or more embodiments, the dot matrix of pixels can include any number of rows and columns. For example, in a square grid, as the number of pixels added to the grid of pixels grows exponentially (e.g., $n^2$), the number of switches needed to control the pixels increases linearly (e.g., 2n). Similarly, in a non-square grid, when the number of pixels is represented as pixels in m columns×pixels in n rows, the number of switches needed to control the pixels equals m+n. To illustrate, FIG. 6C shows a schematic diagram of adding more pixels and switches to the grid shown in FIG. 6A. Notably, the components and connections shown in FIG. 6C have been simplified for purposes of explanation.

As illustrated, FIG. 6C includes column switches 604, row switches 606, and modular light-diffuser devices 608. While not shown for simplicity, each of the modular light-diffuser devices 608 includes a diffuser element (e.g., pixel) that changes from a light-scatter state to a transparent state when power is applied at a column and row junction. Accordingly, each modular light-diffuser device is connected to a column switch and a row switch in parallel (shown as a single serial connection for simplicity).

As shown in FIG. 6C, each column of modular light-diffuser devices 608 can be controlled by a single column switch and each row of modular light-diffuser devices 608 can be controlled by a single row switch. Moreover, when a new row of modular light-diffuser devices is added, only one additional row switch is needed to control those modular light-diffuser devices (and similarly with adding a new column of modular light-diffuser devices). Indeed, the modular light-diffuser system 300 can utilize the processes described above to activate a large number of modular light-diffuser devices 608 with a small number of switches and connections.

In addition, while FIG. 6C shows a grid of modular light-diffuser devices connected via column switches and row switches, in alternative embodiments, the modular light-diffuser devices are serially connected (e.g., daisy chained) in a single connected strand (e.g., via a single switch). For example, data from a controller is passed from one modular light-diffuser device to the next (e.g., making each device a simulated switch) rather than using the each of the column and row switches shown.

In various embodiments, multiple modular light-diffuser systems can be added to an object. For example, an article of clothing can include multiple sets of modular light-diffuser systems (e.g., a controller, row switches, column switches, and modular light-diffuser devices). The modular light-diffuser systems can be located adjacent to or apart from one another. For example, a shirt can have a modular light-diffuser system on the front and multiple modular light-diffuser systems on the back.

Figure 7A:
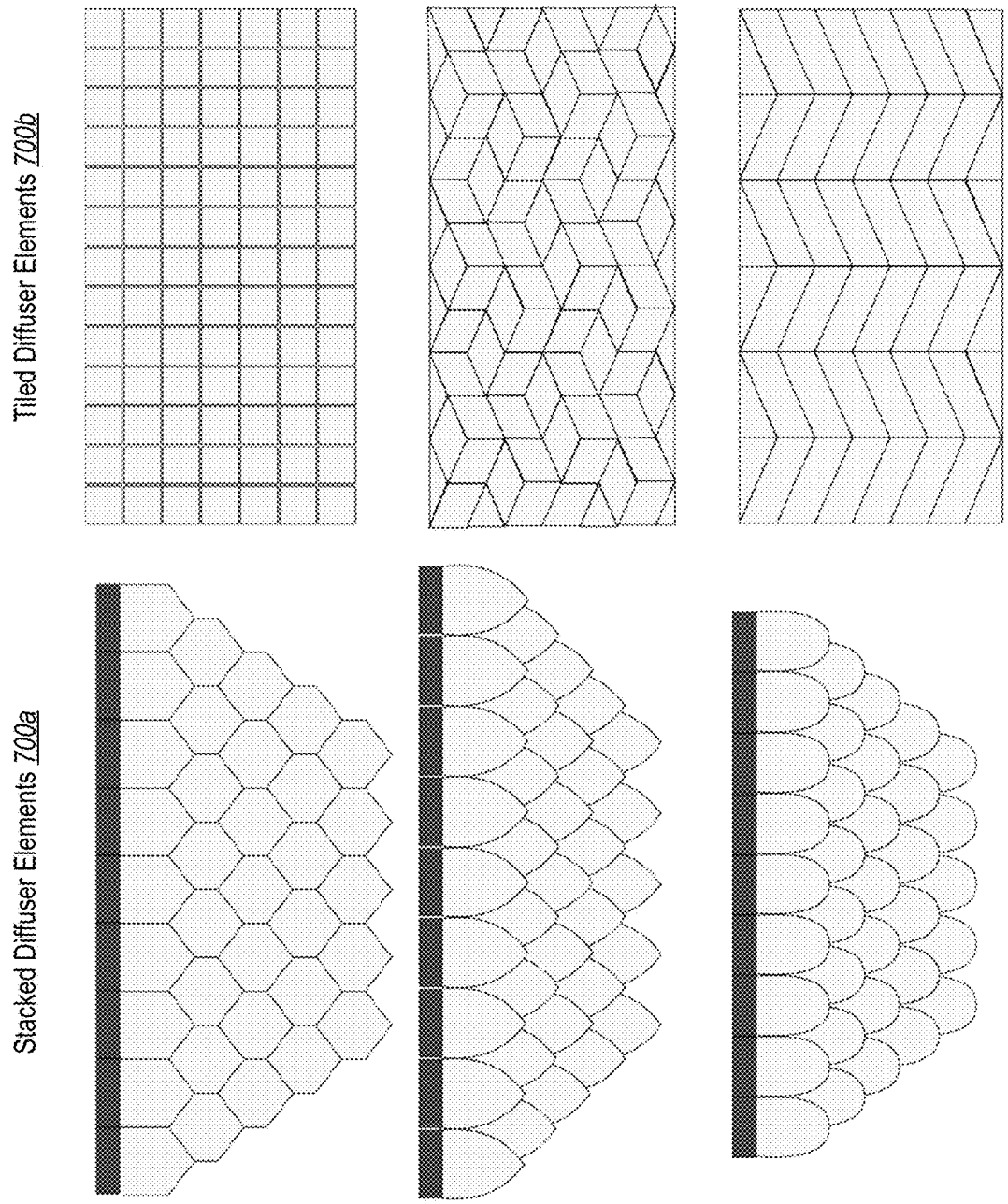
FIGS. 7A-7B illustrate example configurations of PDLC diffuser components in accordance with one or more embodiments.
Figure 7B:
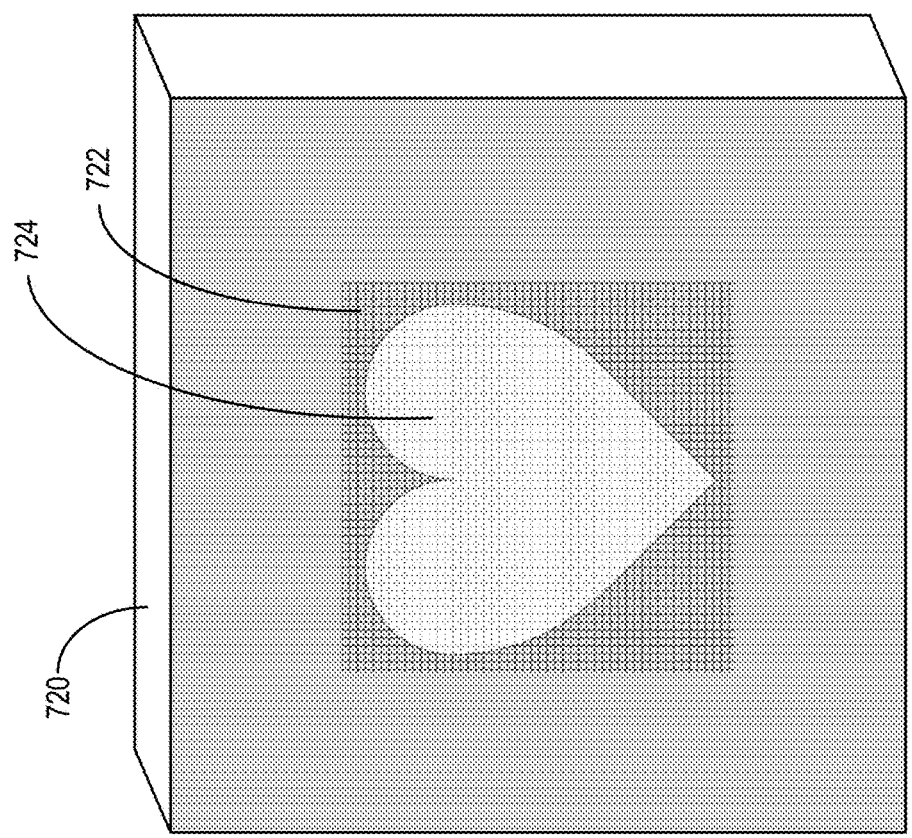

As mentioned above, PDLC diffuser components can range in shape, size, layout, and arrangement. To illustrate, FIGS. 7A-7B illustrate example configurations of PDLC diffuser components in accordance with one or more embodiments. As shown in FIG. 7A, the PDLC diffuser component can be arranged as stacked diffuser elements 700a or as tiled diffuser elements 700b.

As also shown in FIG. 7A, the PDLC diffuser components can vary in shape and size. In many embodiments, a PDLC diffuser component is large enough to enable a modular light-diffuser device to connect to the PDLC diffuser component (e.g., via small conductive elements). In various embodiments, the PDLC diffuser components are square (e.g., 0.25 inches square). In alternative embodiments, some PDLC diffuser components can be rounded, curved, pointed, and/or concave to match a designed pattern or design (e.g., edges of various PDLC diffuser components can be curved to match one or more designs). Further, in one or more embodiments, some PDLC diffuser components can be shaped into thin strips.

As mentioned above, in various embodiments, a PDLC diffuser component can be divided into separate segments (e.g., cut into stripes), which can create a striped effect as the power is pulled down across the film layer (e.g., creating a "bar graph" effect). In additional embodiments, the top and bottom conductive layers (e.g., ITO layers) of the PDLC diffuser components can be segmented in different orientations. For example, the top layer is cut in a horizontal direction and the bottom layers is cut in a vertical direction, which creates a grid pattern as power is provided to the PDLC diffuser component.

In various embodiments, the PDLC diffuser components can show internal designs or patterns when in the transparent state. For example, various PDLC diffuser components can have a white polka dot stenciled on their top layer that is hidden when the PDLC is in the light-scattering state and are revealed when the PDLC diffuser component is in the transparency state. Indeed, the PDLC diffuser components can include a variety of designs or patterns thereon, such as feathers, flowers, or stripes. Further, such patterns and designs can span multiple PDLC components.

As also mentioned above, PDLC diffuser components and corresponding modular light-diffuser devices can be utilized on various types of objects, including portable and non-portable objects. To illustrate, FIG. 7B includes a wall 720 that includes a swatch of modular light-diffuser devices 722 forming a pattern 724 (e.g., a heart shape). As shown, the wall material can be a reflective material (or another color or material as described above) and the pattern 724 is formed by having PDLC diffuser components within the pattern 724 be in a non-powered light-scattering state while the PDLC diffuser components outside of the pattern 724 are in a non-light-scattering state, which reveals the wall 720 behind.

As mentioned above, PDLC diffuser components (i.e., modular light-diffuser devices) can be attached to multiple types of clothing items, such as jewelry, bags, shoes, belts, scarfs, and other accessories. Further, modular light-diffuser devices can be added to cars and busses, walls, windows, signs, and other objects. To illustrate, a bus can include a dot matrix pixel grid or matrix of modular light-diffuser devices controlled by a modular light-diffuser system to change states in a prearranged pattern. Because PDLC diffuser components are passive and reflect light, the modular light-diffuser devices are able to create rich visual effects, even in direct sunlight, which many current LED systems struggle to do.

Turning to FIGS. 8-9, additional detail is provided regarding adding a touch element to a modular light-diffuser device. In various embodiments, the touch element can receive touch input from a user, which enables the modular light-diffuser system to change (e.g., toggle) the state of the one or more modular light-diffuser devices. In some embodiments, user input at a touch element can trigger the modular light-diffuser system to generate a design or animation across multiple modular light-diffuser devices.

FIG. 8 illustrates example layers of a PDLC component 800 with a touch-conductive layer 802 (i.e., touch element) within a modular light-diffuser device in accordance with one or more embodiments. As shown, the PDLC component 800 is similar to the PDLC component 200 described above in connection with FIG. 2A. For example, the PDLC component 800 includes PET film layers 202*a*, 202*b*, conductive coating layers 204*a*, 204*b*, and a polymer layer 206 having dispersed liquid crystal molecules 208.

In addition, the PDLC component 800 includes a touch-conductive layer 802 connected to the first PET film later 202*a*. The touch-conductive layer 802 can be transparent and/or semi-transparent. In some embodiments, the touch-conductive layer 802 includes titanium dioxide ($TiO_2$) or indium tin oxide (ITO).

As shown, the touch-conductive layer 802 is placed on the outside of the PDLC component 800. Indeed, in one or more embodiments, the touch-conductive layer 802 can be the outermost layer of the PDLC component 800 (e.g., the top layer), which enables the touch-conductive layer 802 to receive physical contact from a user. In alternative embodiments, if the touch layer corresponds to a non-conductive layer, such as an impact layer, it can be located elsewhere on the PDLC component 800 (e.g., as the bottom layer).

In a number of embodiments, the touch-conductive layer 802 is connected to the modular light-diffuser device via a separate connection. For example, FIG. 8 shows the connection 804 linking the touch-conductive layer 802 to a power source (e.g., via a modular light-diffuser device). While the connection 804 is shown as a single conductive element (or connection medium), in various embodiments, the touch-conductive layer 802 can include multiple conductive elements to the modular light-diffuser device.

While the touch element is shown as a single layer (i.e., the touch-conductive layer 802, in various embodiments, the touch element can include multiple layers and/or additional pieces. To illustrate, in one or more embodiments, the touch element is a vibration switch that includes a weighted spring and/or creates a short based on impact (e.g., momentary contact) from user touch input. The circuitry (e.g., capacitive sensor) for the vibration switch can be located on the PDLC component 800, on the corresponding modular light-diffuser device, or elsewhere within the modular light-diffuser system (e.g., on a separate regular or flexible PCB such as an edge circuit board).

In other embodiments, the touch element is a control level analog switch located along the edges of one or more of the modular light-diffuser devices. For instance, a touch bar located next to one or more diffuser elements may enable better user touch input detection when the diffuser elements are small in size. In another instance, the touch element forms a thin conductive mesh on the outer edge of one or more of the diffuser elements. Indeed, the touch element can correspond to one or more touch layers, seams, edges, meshes, and/or conductive elements associated with the modular light-diffuser devices.

In some embodiments, the touch element is a tap sensor that can differentiate duration types of user touch input. For example, the touch element signals to the modular light-diffuser system whether a short touch or a longer tap is detected. In response, the modular light-diffuser system can execute different actions based on the type of touch detected. Similarly, different actions can be triggered based on detecting multiple touches occurring at the same time from a particular combination of touch elements.

In still other embodiments, the touch element can include a tilt switch that detects user touch input when based on an inner component of the tilt switch contacting an edge component of the tilt switch. To illustrate, when a user presses a tilt switch associated with a modular light-diffuser device, the tilt switch detects the user input and sends a touch signal to the modular light-diffuser system. The tilt switch can be an additional element added to one or more of the other touch elements described above. In alternative embodiments, the tilt switch can activate when a particular orientation is detected.

Regardless of the type of touch element, when the touch element detects user touch input in response to a user touching the touch element (e.g., the touch-conductive layer 802), the touch element can provide a signal to the modular light-diffuser device indicating the user touch input. In response, the modular light-diffuser device (e.g., via a modular light-diffuser system) can toggle its state from light-scattering to transparent, or vice versa.

In some embodiments, detection of the user touch input causes the modular light-diffuser system to create a design, pattern, or animation. For example, based on the user selecting the touch-conductive layer 802 corresponding to a particular modular light-diffuser device, the modular light-diffuser system causes one or more of the modular light-diffuser devices to flash together (e.g., quickly switch between states) until an additional touch input of the target modular light-diffuser device is detected.

Further, the modular light-diffuser system can detect multiple user touch inputs at the same time. For example, multiple modular light-diffuser devices in a modular light-diffuser system each include touch elements. If a user provides touch input that contacts the touch element for two or more of the modular light-diffuser devices, then the modular light-diffuser system can toggle the state of the corresponding modular light-diffuser devices.

Figure 9A:
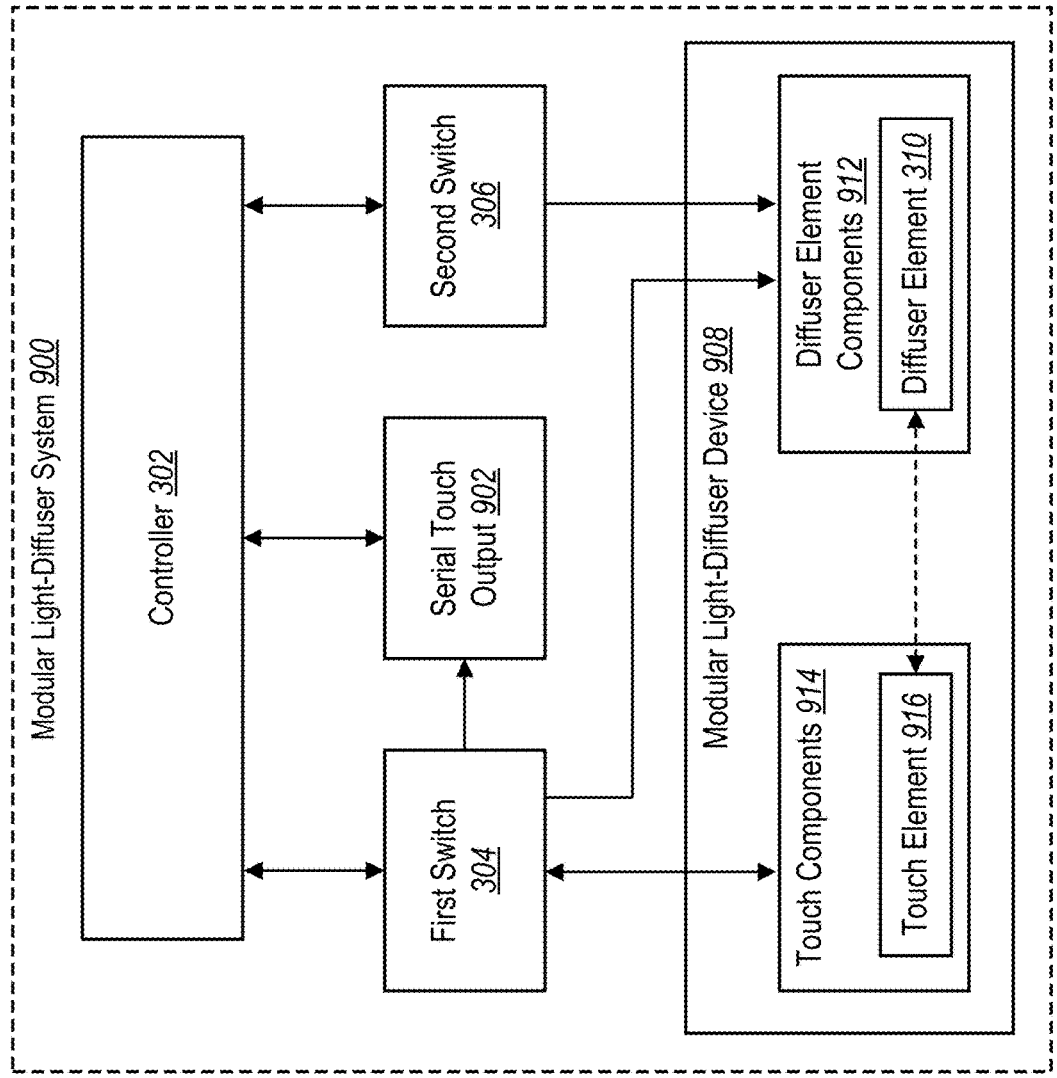
FIGS. 9A-9B illustrate example schematic diagrams of a modular light-diffuser system having touch capabilities in accordance with one or more embodiments.

FIG. 9A illustrates an example modular light-diffuser system 900 with touch capabilities in accordance with one or more embodiments. In general, the modular light-diffuser system 900 expands upon the modular light-diffuser system 300 introduced above with respect to FIG. 3. To illustrate, the modular light-diffuser system 900 includes the controller 302, the first switch 304, and the second switch 306 introduced above. In addition, the modular light-diffuser system 900 includes a serial touch output 902 (e.g., shift register) and a modular light-diffuser device 908 having diffuser element components 912 and the diffuser element 310. In addition, the modular light-diffuser device 908 includes touch components 914 and the touch element 916.

As shown, the modular light-diffuser device 908 includes the diffuser element 310. In various embodiments, the diffuser element 310 corresponds to the PDLC component previously described. As also shown, the modular light-diffuser device 908 includes diffuser element components 912. For example, the diffuser element components include inputs, diodes, and outputs, as described previously in connection with FIG. 5A. Also, while the diffuser element 310 is shown as part of the modular light-diffuser device 908, the diffuser element 310 can be physically separated (e.g., only connected via conductive elements) from the modular light-diffuser device 908, as previously explained.

In one or more embodiments, the touch element 916 corresponds to the touch-conductive layer or another type of touch element, described above. Further, the touch components 914 can correspond to circuitry needed to detect when user touch input has occurred at the touch element 916. While the touch element 916 is shown on the modular light-diffuser device 908, the touch element 916 can be attached to the diffuser element 310 (indicated by the dashed line) and located apart from the modular light-diffuser device 908.

As shown, the first switch 304 (e.g., a column switch) and the second switch 306 (e.g., a row switch) can provide power to the diffuser element 310 via the diffuser element components 912. As also shown, the first switch 304 can provide power to the touch components 914 and the touch element 916. For example, in the case of a capacitive touch element, the touch components 914 can utilize the low-voltage power to charge up a touch capacitor. In various embodiments, the touch components 914 and the touch element 916 can also be connected to, and draw power from, the second switch 306. In alternative embodiments, the touch components 914 and the touch element 916 receives power from a non-switch component or directly from the power source.

In addition, the touch components 914 and the touch element 916 can provide a signal when user touch input is detected. For example, as shown, the touch components 914 can provide a touch signal (e.g., 3 volts) to the first switch 304 when user touch input is detected. The signal can either be provided by the touch components 914 (e.g., a signal push) or detected by the controller 302 via the first switch 304 and the serial touch output 902 (e.g., a signal pull).

To illustrate, the controller 302 can check each modular light-diffuser device individually for a touch signal or can check modular light-diffuser devices per row or per column basis in a manner similar to activating the modular light-diffuser devices, as described above in connection with FIG. 6A. For example, the controller 302 sends a touch verification signal to all of the modular light-diffuser devices in a row, then proceed to send the touch verification signal to single columns. When user touch input has occurred at a specific modular light-diffuser device, the touch signal is provided to the controller 302 via the first switch 304 and/or the second switch 306.

Further, the first switch 304 can output the signal to the controller 302 via a serial touch output 902 (e.g., a shift register). In alternative embodiments, the touch components 914 provide an additional or alternative signal to the second switch 306 which additionally or alternatively passes the signal to the controller 302 (e.g., as a separate serial touch output or via a second shift register). Further, in some embodiments, the touch components 914 can bypass the switches and directly send the user touch input signal to the controller 302. In alternative embodiments, a separate touch detection device can process the signal to detect the user touch input, and provide the user touch input to the controller 302.

Figure 9B:
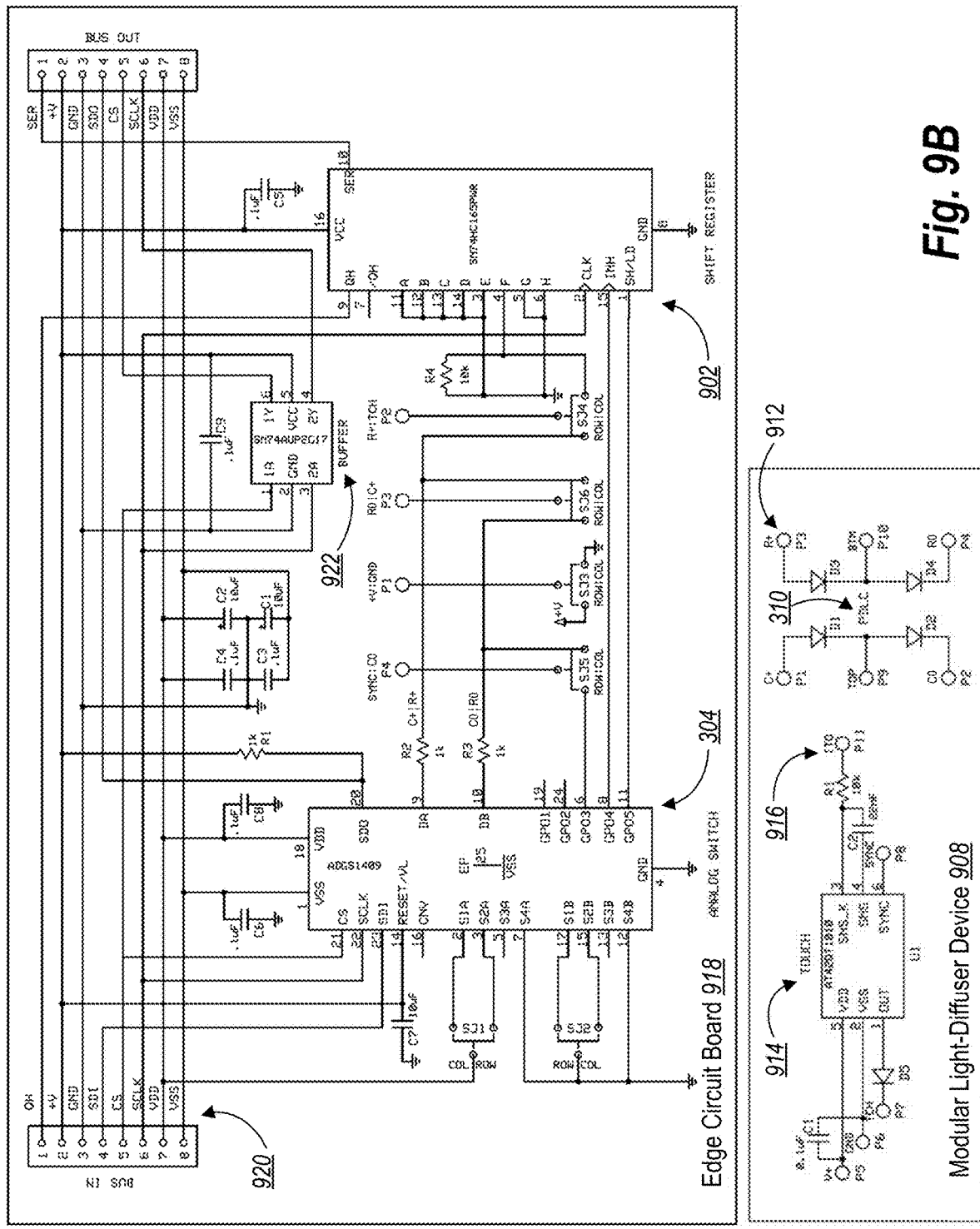

FIG. 9B illustrates an example circuit diagram of a modular light-diffuser system with touch capabilities in accordance with one or more embodiments. In general, the circuit diagram in FIG. 9B corresponds to the modular light-diffuser system 900 with touch capabilities shown in FIG. 9A, except that FIG. 9B omits the second switch 306 and the controller 302 shown in FIG. 9A. In various embodiments, the serial bus 920 in FIG. 9B can connect to the controller 302 shown in FIG. 9A.

As shown, the modular light-diffuser device 908 includes the diffuser element components 912, the diffuser element 310, the touch components 914, and the touch element 916. In various embodiments, the modular light-diffuser device is located on a regular or flexible PCB, as shown. For example, the PCB includes the touch components 914 and the diffuser element components 912, but not the touch element 916 or the diffuser element 310.

As described previously, the diffuser element components 912 include the first input (i.e., C+), the first diode, the second diode, and the first output (i.e., C0), serially connected. The diffuser element components 912 also includes the second input (i.e., R+), the third diode, the fourth diode, and the second output (i.e., R0), serially connected. In addition, the diffuser element components 912 connects to the diffuser element 310, as previously described.

As illustrated, pins 1-4 (i.e., P1-P4) of the diffuser element components 912 connect to the first switch 304. Further, pins 9-10 (i.e., P9-P10) locally connect the diffuser element components 912 to the diffuser element 310 (e.g., via conductive elements). For example, pins 9-10 correspond to conductive elements 218a-218b shown in FIGS. 2C-2D. As shown, the pins 9-10 on the first switch 304 include current limiting resistors (i.e., R2 and R3) to prevent short circuits to the first switch 304 should a short occur within the modular light-diffuser system (e.g., with another modular light-diffuser device). These current limiting resistors provide an additional level of safety by preventing shorts, which can damage components of the modular light-diffuser system.

In various embodiments, the PCB that includes the diffuser element components can include multiple sets of diffuser element components 912. For example, if multiple diffuser elements are stacked together, each of the diffuser elements can be connected to a separate set of diffuser element components. Accordingly, each of the sets of diffuser element components can be included together on the same PCB (e.g., on a regular or flexible PCB).

In one or more embodiments, the touch components 914 can include a momentary capacitive touch sensor circuit. Indeed, as shown, the touch components 914 can include input, outputs, capacitors, a resistor, and a diode. For example, pins 3 and 4 connect the touch element 916 (e.g., a touch-conductive layer) to the touch components 914 via a resistor and a capacitor. Also, pin 1 can output a high logic signal (e.g., 3-5 volts) to the serial touch output 902 via the edge circuit board 918 (e.g., see "TCH" on the edge circuit board 918 next to input P2 that feeds into the touch output 902) to indicate when user touch input has been detected, as described below in connection with FIG. 10. Also, pin 1 can connect to the diode to prevent unwanted voltage from other modular light-diffuser devices from backflowing into the touch components 914.

As mentioned above, the touch components 914 can provide a touch signal to the controller through the serial touch output 902 (e.g., shift register) and the serial bus 920. For example, in some embodiments, P7 (i.e., connected to pin 1) of the touch components 914 connects to P2 and SJ4 on the edge circuit board 918. When connected to the shift register, the touch signal (e.g., 3 volts) is provided to the shift register via input F. When not connected to the shift register, the pull-down resistor (i.e., R4) ensures that signal to input F at the shift register is low (e.g., 0 volts), thus, preventing a false positive touch signal.

In some embodiments, as mentioned previously, the modular light-diffuser system can provide a touch verification signal to modular light-diffuser devices in a swatch of modular light-diffuser devices on a per row or per column basis. Further, the modular light-diffuser system can set the touch signal in the serial touch output 902 to high for all modular light-diffuser devices in a row. Then, the modular light-diffuser system can query each modular light-diffuser device in the row, moving from column to column. If a modular light-diffuser device in a column has detected a user input touch, the modular light-diffuser device sends backs a touch signal (e.g., 3 volts) to the corresponding analog switch, which is provided to the controller as described above. The controller can determine that the row switch and the column switch for the modular light-diffuser device both indicate a touch signal, and perform a predetermined action in response (e.g., toggle the state of the modular light-diffuser device).

In some embodiments, the touch components 914 are located apart from the modular light-diffuser device 908 (e.g., on a different PCB than the diffuser element components 912). For example, the touch components 914 is located on the edge circuit board 918 near to the first switch 304. In one or more embodiments, the same touch component circuitry shown in the modular light-diffuser device 908 is located on the edge circuit board 918. In alternative embodiments, the touch components 914 is an I2C touch controller located on the edge circuit board 918 that can detect user input touch at up to twelve modular light-diffuser devices. For instance, the touch components 914 detect when a voltage drop occurs at a touch element associated with a modular light-diffuser device.

As mentioned above, the modular light-diffuser device 908 can connect to the edge circuit board 918. As shown, the edge circuit board 918 includes the first switch 304 and a serial touch output 902 (e.g., the shift register). In one or more embodiments, the edge circuit board 918 can include a multiplexor that includes various input and outputs. For instance, the edge circuit board 918 receives input signals from a controller via the serial bus 920 as well as provides one or more outputs to the controller via the serial bus 920. For example, the first switch 304 receives inputs associated with one or more clocks, positive voltage, ground, and source terminal information. As another example, the serial touch output 902 receives, as an input, the output of the touch components 914 indicating when user touch input has been detected.

As shown, the edge circuit board can also include a buffer 922. In various embodiments, the buffer 922 helps to refresh control signals from the serial bus 920. Accordingly, when multiple modular light-diffuser devices are controlled by the same controller via the serial bus 920, the buffer 922 ensures that each of the modular light-diffuser devices receives a strong logic signal. Indeed, the buffer 922 prevents signal fanout from occurring when multiple modular light-diffuser devices are connected via the serial bus 920.

The first switch 304 can also provide outputs to the modular light-diffuser device 908, as previously described. For example, the first switch 304 provides positive voltage (e.g., C+) to the first input of the modular light-diffuser device 908 through P1. Similarly, the first switch 304 can provide ground (e.g., C0) to the first output of the modular light-diffuser device 908 through P2. Also, when switching the modular light-diffuser device 308 to the light-scattering state, the first switch 304 can provide ground to both the first input as well as the first output, as described above.

For simplicity, the first switch 304 shows only column switch outputs (e.g., C+/C0); however, the circuitry of the switch could likewise provide row switch outputs (e.g., R+/R0). Indeed, the modular light-diffuser system can utilize a second analog switch like the first switch 304 to provide row switch outputs (e.g., R+/R0) to the modular light-diffuser device 908. Here, the second analog switch provides the positive voltage (e.g., R+) to the second input through P3 as well as provides ground (e.g., R0) to the second output of the modular light-diffuser device 908 through P4.

As mentioned above, the circuit diagram in FIG. 9B does not include the second switch 306 included in the modular light-diffuser system 900 shown in FIG. 9A. In some embodiments, the second switch 306 is the same as the first switch 304 (e.g., the second switch 306 is a duplicative copy of the edge circuit board 918 that provides R+/R0 in place of C+/C0). For example, the second switch 306 outputs to the controller 302 and a second serial touch output. In alternative embodiments, the second switch 306 is located on an edge circuit board 918 that includes the second switch 306, but not the serial touch output 902. In these embodiments, the second switch 306 can utilize the outputs to the serial bus 920 without additional outputs.

As also shown, the first switch 304 can provide additional output to the serial touch output 902. For example, the first switch 304 utilizes one or more of the general purpose digital outputs (GPOs) to provide a clock, load, and other signals to the serial touch output 902. In various embodiments, the serial touch output 902 is a shift register that receives parallel inputs and provides a serial output. Accordingly, upon receiving a signal indicating that user touch input has been detected, the serial touch output 902 can translate the signal into serial data and provide the signal to the controller in serial via the serial bus 920.

In many embodiments, by utilizing the general purpose digital outputs of the first switch 304, the first switch 304 can connect to the modular light-diffuser device 908 using fewer connections when the modular light-diffuser device 908 has touch capabilities (and less connections when the modular light-diffuser device does not include touch capabilities). Reducing the number of connections to two or three ensures that the connections between components can easily move and flex, as described above.

While the serial touch output 902 is shown in FIG. 9B on the edge circuit board 918 along with the first switch 304, in one or more embodiments, the serial touch output 902 is located on a separate PCB (e.g., a regular or flexible PCB). For example, in some embodiments, the first switch 304, the serial touch output 902, the touch components 914, and the diffuser element components 912 are each located on separate PCBs.

As mentioned above, in some cases, the modular light-diffuser device does not include touch capabilities. In these embodiments, the PCB that includes the modular light-diffuser device 908 can include the diffuser element components 912 but omit the touch components 914. Further, in these embodiments, the edge circuit board 918 can include the first switch 304, but omit the serial touch output 902. Accordingly, when the touch capabilities are omitted or separated out, the edge circuit board 918 and/or the modular light-diffuser device 908 can further reduce in size.

In a number of embodiments, the edge circuit board 918 is printed on a circuit board between 25-50 millimeters. Also, in some embodiments, one or more components of the modular light-diffuser device 908 can be printed as a 4-millimeter square circuit board or dot that connects to the diffuser element 310. As mentioned above, the circuitry involved with the modular light-diffuser devices is small enough to easily fit on a portable object, such as fabric, clothing, accessories, or other portable objects without interfering with the operation of the object or without hindering the user utilizing the object.

FIG. 10 illustrates a state diagram 1000 of changing the state of a modular light-diffuser device based on user touch input in accordance with one or more embodiments. In some embodiments, the touch components 914 and the touch element 916 perform some or all of the actions shown in the state diagram 1000. In various embodiments, the modular light-diffuser system 900 can perform some or all of the actions shown in the state diagram 1000.

To illustrate, the state diagram 1000 includes an act 1002 of charging a touch capacitor. For example, as mentioned above, in various embodiments, the touch element can correspond to a vibration switch or other type of touch element that acts as a capacitor. In a number of embodiments, the modular light-diffuser system and/or the touch components build up a capacitive charge.

Next, the state diagram 1000 includes an act 1004 of checking the charge of the capacitor. For example, at each clock cycle, or at another interval, the modular light-diffuser system checks to determine whether the capacitor is charged or discharged. In one or more embodiments, the modular light-diffuser system, via an analog switch and/or a serial touch output, checks to see whether the touch capacitor is charged.

If the touch capacitor associated with a touch element and a modular light-diffuser device is determined to be charged (i.e., the act 1006), the modular light-diffuser system can re-check (e.g., the act 1004) the touch capacitor at the next clock cycle (or at another interval), as shown. Otherwise, if the capacitor is discharged (i.e., act 1008), the modular light-diffuser system can trigger a state change from the user element of the modular light-diffuser device.

To illustrate, the state diagram 1000 includes the act 1010 of toggling the state of the diffuser element of the modular light-diffuser device. Accordingly, if the diffuser element is in the light-scattering state, the modular light-diffuser system can switch the state of the diffuser element to the transparent state, and vice versa. Further, in some embodiments, the modular light-diffuser system can perform additional or alternative actions, such as modifying multiple modular light-diffuser devices to create a display or performing an animation across multiple modular light-diffuser devices based on detecting that the user touch input for the modular light-diffuser device is associated with a design or animation trigger. Additionally, besides generating animations or patterns, the touch input could be used a button to activate a standby mode, change modes, change settings, or perform other operations.

Upon toggling the state of the diffuser element (i.e., the act 1010), the state diagram 1000 can return to the act 1002 of charging the touch capacitor. Further, the touch components and/or the modular light-diffuser system can repeat the acts found in the state diagram 1000. For example, the modular light-diffuser system can again detect additional user touch input and toggle the state of the diffuser element back to the original state based on detecting the additional user touch input.

FIGS. 1A-10 and the corresponding text provide a number of different examples of a modular light-diffuser devices and system. Further, FIGS. 1A-10 and the corresponding text provide methods, systems, and devices of a modular light-diffuser system that utilizes one or more modular light-diffuser devices. In addition to the foregoing, one or more embodiments can also be described in terms of flowcharts comprising acts for accomplishing a particular result, such as the flowcharts of acts shown in FIG. 11. Additionally, the acts described herein may be repeated or performed in parallel with one another or parallel with different instances of the same or similar acts.

Figure 11:
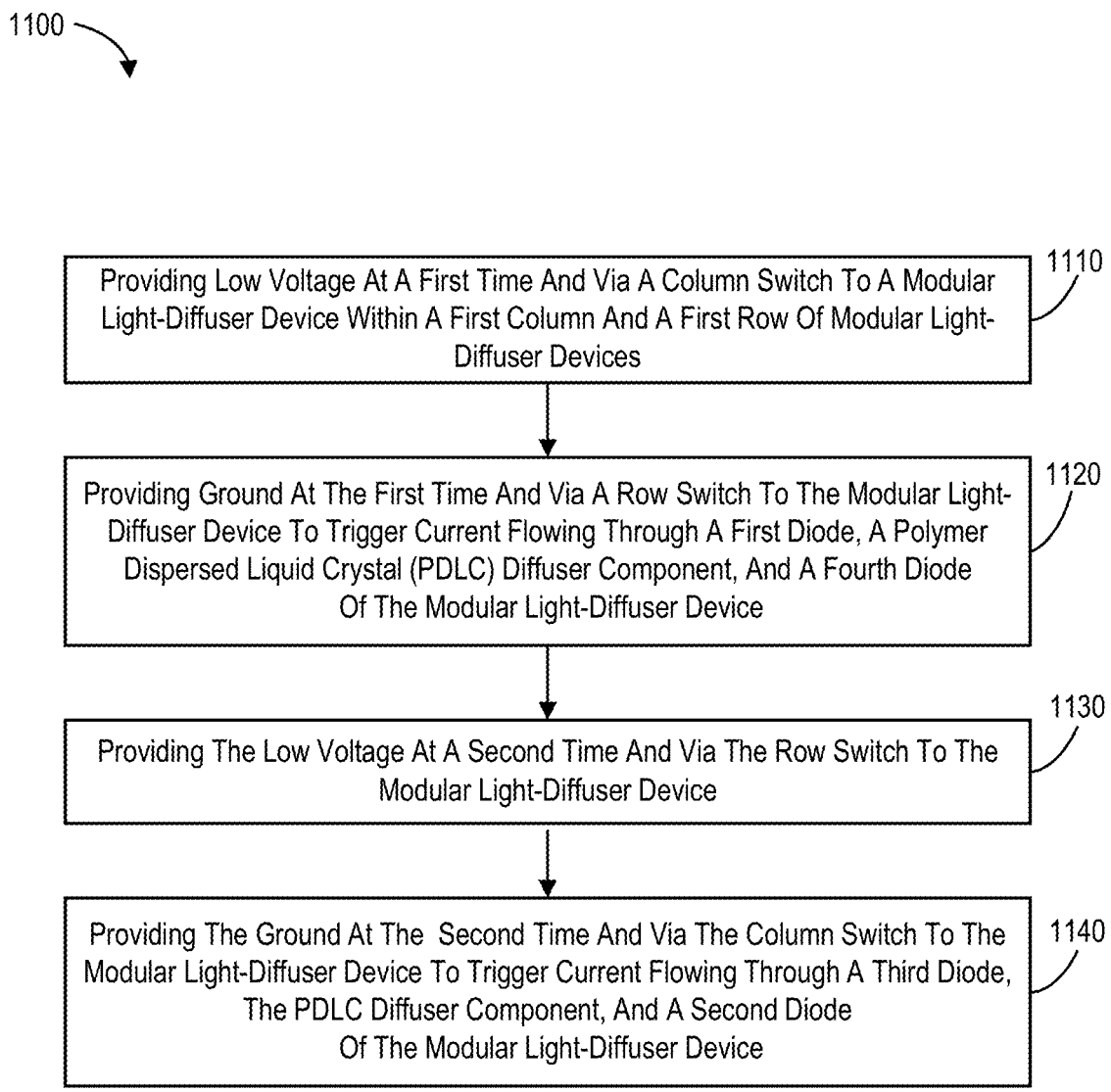
FIG. 11 illustrates a flowchart of a series of acts of utilizing a modular light-diffuser device in accordance with one or more embodiments.

As mentioned, FIG. 11 illustrates a flowchart of a series of acts 1100 of utilizing one or more modular light-diffuser devices and/or displaying one or more modular light-diffuser devices on an object in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, in some embodiments, a non-transitory computer-readable medium can comprise instructions that, when executed by one or more processors, cause a computing device (or portion thereof), or a set of programmable components, to perform the acts of FIG. 11. In some embodiments, a system can perform the acts of FIG. 11.

In one or more embodiments, the series of acts 1100 is implemented on one or more computing devices, such as a client device or a set of specialized hardware components designed for execution thereof. For example, the series of acts 1100 is implemented on a computing device having memory that maintains the various states of one or more modular light-diffuser devices.

The series of acts 1100 can include an act 1110 of providing low voltage at a first time and via a column switch to a modular light-diffuser device within a first column and a first row of modular light-diffuser devices. In particular, the act 1110 can involve providing, via a first column analog switch at a first time period of a frequency, a low voltage supply to a first modular light-diffuser device arranged within a first column of one or more columns and a first row of one or more rows of modular light-diffuser devices. In one or more embodiments, the first modular light-diffuser device is flexibly attached (e.g., sewn, crimped, screwed, glued, taped) to fabric (e.g., clothes). In some embodiments, the low voltage supply is between seven and fifteen volts. In one or more embodiments, the frequency is at least 50 Hertz.

In one or more embodiments, the first modular light-diffuser device includes a first input, a first diode, a second diode, and a first output serially connected (e.g., a first set of elements). Further, the first modular light-diffuser device can include a second input, a third diode, a fourth diode, and a second output serially connected (e.g., a second set of elements). In addition, the first modular light-diffuser device can include a PDLC diffuser component (e.g., diffuser element) having a top conductive coating layer and a bottom conductive coating layer, where the top conductive coating layer is connected between the first diode and the second diode, and where the bottom conductive coating layer is connected between the third diode and the fourth diode.

As shown, the series of acts 1100 also includes an act 1120 of providing ground at the first time and via a row switch to the modular light-diffuser device to trigger current flowing through a first diode, a PDLC diffuser component, and a fourth diode of the first diffuser modular device. In particular, the act 1120 can involve providing, via a first row analog switch at the first time period of the frequency, a ground to the first modular light-diffuser device to trigger a first current flowing through a first diode, a polymer dispersed liquid crystal (PDLC) diffuser component, and a fourth diode of the first diffuser modular device, the first current causing the PDLC diffuser component to maintain a non-light-scattering state (e.g., transparent state). In various embodiments, the first current and the second current flow in opposite directions through the PDLC component. In some embodiments, the first current is blocked from flowing through the second diode and the third diode of the first modular light-diffuser device at the first period of the frequency. In one or more embodiments, the ground is at zero volts.

As shown in FIG. 11, the series of acts 1100 further includes an act 1130 of providing the positive low voltage at a second time and via the row switch to the modular light-diffuser device. In particular, the act 1130 can include providing, via the first row analog switch at a second time period of the frequency, the positive low voltage supply to the first modular light-diffuser device.

As shown, the series of acts 1100 also includes an act 1140 of providing the ground at the second time and via the column switch to the modular light-diffuser device to trigger current flowing through a third diode, the PDLC diffuser component, and a second diode of the first diffuser modular device. In particular, the act 1140 can include providing, via the first column analog switch at the second time period of the frequency, a ground to the first modular light-diffuser device to trigger a second current flowing through a third diode, the PDLC diffuser component, and a second diode of the first diffuser modular device, the second current causing the PDLC diffuser component to maintain the transparent state.

The series of acts 1100 can include one or more additional acts. In one or more embodiments, the series of acts 1100 can include utilizing a microprocessor to control a set of column analog switches and a set of row analog switches to execute a predefined animation pattern by toggling the modular light-diffuser devices between a light-scattering state and the non-light-scattering state. In many embodiments, the modular light-diffuser device changes states between the light-scattering state and the non-light-scattering state.

In various embodiments, the series of acts 1100 can include the controller receiving the predefined animation pattern wirelessly from a computing device that is associated with a separate set of modular light-diffuser devices based on the modular light-diffuser devices coming within a proximity (e.g., distance) of the separate set of modular light-diffuser devices. For example, if a first user wearing a garment having a first set of modular light-diffuser devices comes within a proximity (e.g., a few feet) of another user wearing a garment having a having a second set of modular light-diffuser devices, one of the sets of modular light-diffuser devices may interact with the other to form a coordinated display. For instance, one or both sets may wireless communicate with each other to provide an animation or pattern as well as a timing scheme for showing a coordinated display between the two sets of modular light-diffuser devices.

In some embodiments, the series of acts 1100 includes detecting a touch input of the first modular light-diffuser device based on a touch detection component coupled to the first light-diffuser module device and toggling the state of the first light-diffuser module device between a light-scattering state and the transparent state based on the detected touch input.

In one or more embodiments, the first modular light-diffuser device is included on a regular or flexible printed circuit board (PCB) that has the first input, the second input, the first diode, the second diode, the third diode, the fourth diode, the first output, and the second output (but not the PDLC diffuser component).

In various embodiments, the PDLC diffuser component of the first modular light-diffuser device includes a top polyethylene terephthalate (PET) film layer, a bottom PET film layer, a polymer layer including liquid crystal molecules (e.g., a PDLC film layer), the top conductive coating layer connected between the top PET film layer and the polymer layer, and the bottom conductive coating layer connected between the polymer layer and the bottom PET film layer. In some embodiments, the PDLC diffuser component further includes a touch-conductive layer attached to the top PET film layer as well as touch detection circuitry coupled to the touch-conductive layer.

In one or more embodiments, the first input receives a positive low voltage at a first point in time, the second input receives the positive low voltage at a second point in time, the first output is connected to ground at the second point in time, and the second output is connected to ground at the first point in time. In some embodiments, the first input and the first output are connected to a first analog switch, the second input and the second output are connected to a second analog switch, and the first analog switch and the second analog switch alternate to provide power to the modular light-diffuser device at a target frequency.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Figure 12:
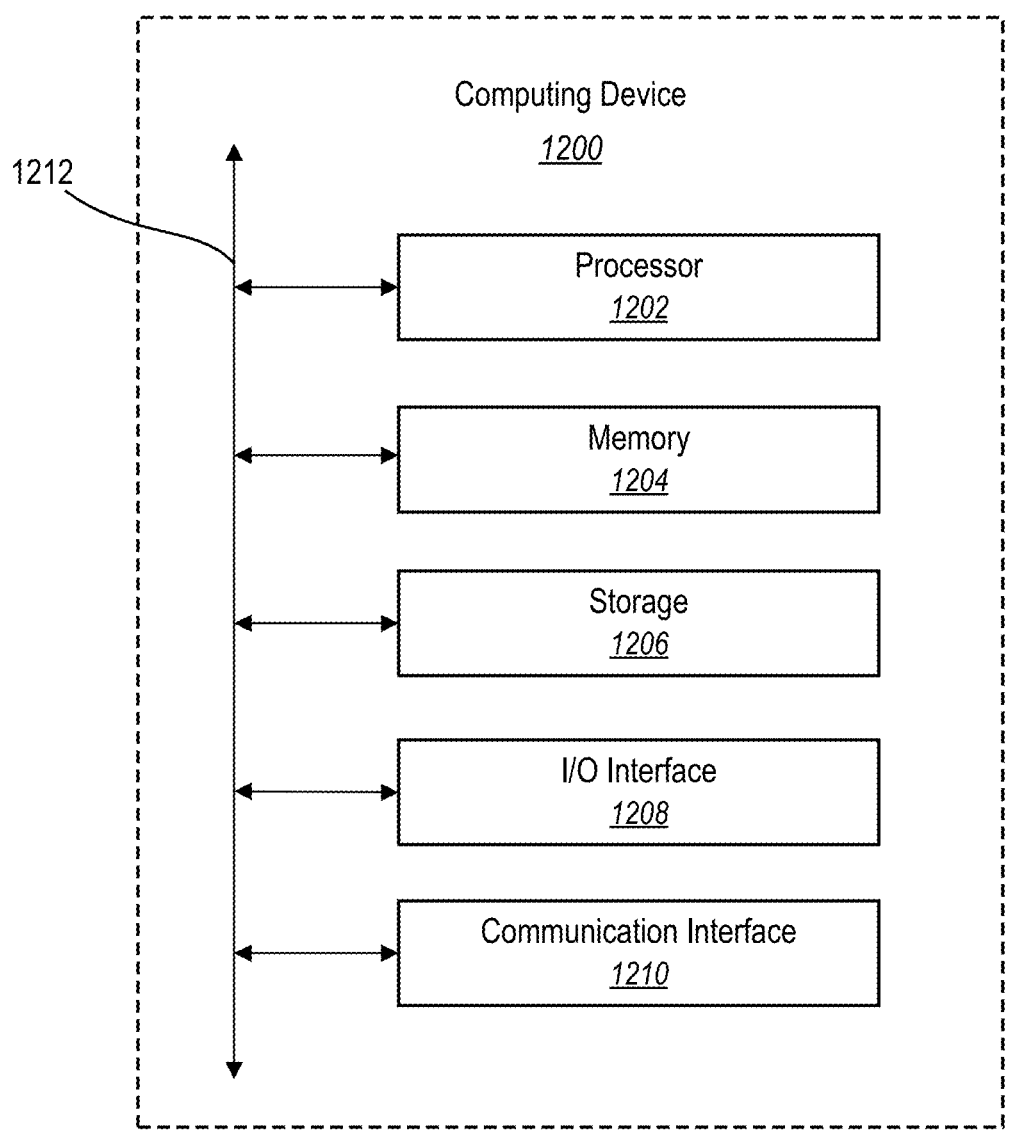
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may be implement a modular light-diffuser system that controls (e.g., directly or indirectly) one or more modular light-diffuser devices. In one or more embodiments, the computing device 1200 may be a mobile device (e.g., a laptop, a tablet, a smartphone, a mobile telephone, a camera, a tracker, a watch, a wearable device, etc.). In some embodiments, the computing device 1200 may be a non-mobile device (e.g., a desktop computer, a server device, a web server, a file server, a social networking system, a program server, an application store, or a content provider). Further, the computing device 1200 may be a server device that includes cloud-based processing and storage capabilities.

As shown in FIG. 12, the computing device 1200 can include one or more processor(s) 1202, memory 1204, a storage device 1206, input/output ("I/O") interfaces 1208, and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In some embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (e.g., user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of these I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A modular light-diffuser device comprising:
 a polymer dispersed liquid crystal (PDLC) diffuser component comprising a first conductive coating layer and a second conductive coating layer;
 a first diode and a second diode, the first conductive coating layer being connected between the first diode and the second diode;
 a third diode and a fourth diode, the second conductive coating layer being connected between the third diode and the fourth diode;
 a first circuit path through the PDLC diffuser component comprising the first diode and the fourth diode; and
 a second circuit path through the PDLC diffuser component comprising a third diode and a second diode;
 wherein the first and second circuit paths are selectively configured to generate current across the PDLC diffuser component in alternating directions to change the PDLC diffuser component from a light-scattering state to a non-light-scattering state.

2. The modular light-diffuser device of claim 1, wherein the PDLC diffuser component further comprises a touch-conductive layer configured to selectively control changes between the light-scattering state and the non-light-scattering state in response to touch input.

3. The modular light-diffuser device of claim 1, further comprising: a reflective backing layer positioned underneath the PDLC diffuser component, wherein the reflective backing layer is visible when the PDLC diffuser component is in the non-light-scattering state and at least partially obscured when the PDLC diffuser component is in the light scattering state.

4. The modular light-diffuser device of claim 3, further comprising:
 at least one additional PDLC diffuser component positioned between the PDLC diffuser component and the reflective backing layer; wherein:
 the reflective backing layer is visible when the PDLC diffuser component and the at least one additional PDLC diffuser component are in the non-light-scattering state;
 the reflective backing layer is at least partially obscured when the PDLC diffuser component is in the light scattering state and the additional PDLC diffuser component is in the non-light-scattering state; and
 the reflective backing layer is further obscured when the PDLC diffuser component and the additional PDLC diffuser component are in the light scattering state.

5. The modular light-diffuser device of claim 1, wherein:
 the first circuit path is connected to a first analog switch;
 the second circuit path is connected to a second analog switch; and
 the first analog switch and the second analog switch generate alternate current power to the modular light-diffuser device at a target frequency.

6. The modular light-diffuser device of claim 1, wherein the PDLC diffuser component comprises:
 a first polyethylene terephthalate (PET) film layer;
 a second PET film layer;
 a polymer layer comprising liquid crystal molecules;
 the first conductive coating layer being connected between the first PET film layer and the polymer layer; and
 the second conductive coating layer being connected between the polymer layer and the second PET film layer.

7. A passive light display system comprising:
 a plurality of modular light-diffuser devices arranged into one or more rows and one or more columns, each of the plurality of modular light-diffuser devices comprising four diodes and a polymer dispersed liquid crystal (PDLC) diffuser component, wherein each of the plurality of modular light-diffuser devices are configured to selectively switch between a light-scattering state and a non-light-scattering state;
 for each row of the one or more rows, a row switch coupled to one or more modular light-diffuser devices of the plurality of modular light-diffuser devices included in the row;
 for each column of the one or more columns, a column switch coupled to one or more modular light-diffuser devices of the plurality of modular light-diffuser devices included in the column; and
 wherein the one or more row switches and the one or more column switches are operable to:
 selectively provide low voltage power to any of the plurality of modular light-diffuser devices to maintain the non-light-scattering state by alternating the low voltage power between column switches and row switches; and
 selectively provide ground to any of the plurality of modular light-diffuser devices to maintain the light-scattering state.

8. The passive light display system of claim 7, wherein:
 the column switch for each column of the one or more columns is operable to selectively provide low voltage, connection to ground, and an open circuit to the one or more modular light-diffuser devices in the column; and
 the row switch for each row of the one or more rows is operable to selectively provide low voltage, connection to ground, and an open circuit to the one or more modular light-diffuser devices in the row.

9. The passive light display system of claim 8, wherein a first modular light-diffuser device of the plurality of modular light-diffuser devices further comprises:
 a touch detection component comprising an integrated circuit, a touch-conductive element connected to a resistor and a capacitor, and a diode connected to a touch output signal; and
 the touch-conductive element is connected to a PDLC diffuser component of the first modular light-diffuser device.

10. The passive light display system of claim 9, further comprising:
 for each column of the one or more columns, a column edge circuit board that comprises the column switch, a column shift register that receives touch detection input, and a column buffer, wherein the column edge circuit board is coupled to the one or more modular light-diffuser devices of the plurality of modular light-diffuser devices included in the column; and for each row of the one or more rows, a row edge circuit board that comprises the row switch of a first row of the one or more rows, a row shift register that receives touch detection input, and a row buffer, wherein the row edge circuit board is coupled to the one or more modular light-diffuser devices of the plurality of modular light-diffuser devices included in the row.

11. The passive light display system of claim 10, further comprising:
a controller;
a serial bus; and
wherein:
the controller is connected to each of the column edge circuit boards and each of the row edge circuit boards via the serial bus; and
the controller is configured to cause a first column switch and a first row switch to provide alternating low voltage power to the first modular light-diffuser device of the plurality of light-diffuser devices to maintain the non-light-scattering state.

12. The passive light display system of claim 11, wherein:
the touch detection component of the first modular light-diffuser device is connected to the first column switch that is located on a first column edge circuit board;
an output of the first column switch is connected to an input of the first column shift register that is located on the first column edge circuit board;
a serial output of the first column shift register is connected to the serial bus; and
the touch detection component of the first modular light-diffuser device provides the touch detection signal to the controller via the first column switch and the first column shift register that are located on the first column edge circuit board.

13. The passive light display system of claim 12, wherein the plurality of modular light-diffuser devices are arranged into a large format display.

14. A method for displaying a plurality of modular light-diffuser devices on a reflective object, the method comprising:
providing, via a first column switch at a first time period of a frequency, a low voltage to a first modular light-diffuser device arranged within a first column of one or more columns and a first row of one or more rows of modular light-diffuser devices;
providing, via a first row switch at the first time period of the frequency, a ground to the first modular light-diffuser device to trigger a first current flowing through a first diode, a polymer dispersed liquid crystal (PDLC) diffuser component, and a fourth diode of the first modular light-diffuser device, the first current causing the PDLC diffuser component to maintain a non-light-scattering state;
providing, via the first row switch at a second time period of the frequency, the positive low voltage to the first modular light-diffuser device; and
providing, via the first column switch at the second time period of the frequency, a ground to the first modular light-diffuser device to trigger a second current flowing through a third diode, the PDLC diffuser component, and a second diode of the first modular light-diffuser device, the second current causing the PDLC diffuser component to maintain the non-light-scattering state.

15. The method of claim 14, wherein the first modular light-diffuser device is flexibly attached to a flexible surface.

16. The method of claim 14, wherein the first current and the second current flow in opposite electrical polarity directions through the PDLC component.

17. The method of claim 14, wherein the first current is blocked from flowing through the second diode and the third diode of the first modular light-diffuser device at the first time period of the frequency.

18. The method of claim 14, further comprising utilizing a controller to control a set of column switches and a set of row switches to execute a predefined animation pattern by toggling the modular light-diffuser devices between a light-scattering state and the non-light-scattering state.

19. The method of claim 18, wherein the controller receives the predefined animation pattern wirelessly from a computing device that is associated with a separate set of modular light-diffuser devices based on the modular light-diffuser devices coming within a proximity distance of the separate set of modular light-diffuser devices.

20. The method of claim 14, wherein:
the positive low voltage is at or between five and thirty volts;
the ground is at or between zero and negative thirty volts; and
the frequency is at least 50 Hertz.

* * * * *